(12) United States Patent
McHenry

(10) Patent No.: US 12,463,416 B2
(45) Date of Patent: Nov. 4, 2025

(54) BACKFEED ELECTROCUTION PREVENTION DEVICES, SYSTEMS AND METHOD

(71) Applicant: MW HOLDINGS GROUP, LLC, Fairfield, AL (US)

(72) Inventor: Larry McHenry, San Antonio, TX (US)

(73) Assignee: Power Grid Professionals Inc, Birmingham, AL (US)

( * ) Notice: Subject to any disclaimer, the term of this patent is extended or adjusted under 35 U.S.C. 154(b) by 0 days.

(21) Appl. No.: 18/549,828

(22) PCT Filed: Dec. 6, 2022

(86) PCT No.: PCT/US2022/081046
§ 371 (c)(1),
(2) Date: Sep. 8, 2023

(87) PCT Pub. No.: WO2024/123367
PCT Pub. Date: Jun. 13, 2024

(65) Prior Publication Data
US 2024/0186786 A1    Jun. 6, 2024

(51) Int. Cl.
H02H 7/22 (2006.01)
H02H 1/00 (2006.01)

(52) U.S. Cl.
CPC ............ H02H 7/22 (2013.01); H02H 1/0007 (2013.01)

(58) Field of Classification Search
CPC ...... H02H 7/22; H02H 1/0007; H02H 11/002; H02H 3/18; H02H 3/24; H02H 3/003
See application file for complete search history.

(56) References Cited

U.S. PATENT DOCUMENTS

| | | |
|---|---|---|
| 5,903,065 A | 5/1999 | Dragos |
| 6,172,432 B1 | 1/2001 | Schnackenberg et al. |
| 6,181,028 B1 | 1/2001 | Kern et al. |
| 6,531,790 B2 | 3/2003 | Panuce et al. |
| 6,825,578 B2 | 11/2004 | Perttu |
| 6,876,103 B2 | 4/2005 | Radusewicz et al. |
| 7,005,590 B1 | 2/2006 | Willis |
| 7,148,585 B2 | 12/2006 | Goss |

(Continued)

FOREIGN PATENT DOCUMENTS

EP    2975728    9/2017

OTHER PUBLICATIONS

Written Opinion and International Search Report from Related PCT Application PCT/US2022/081046, Mailed Sep. 6, 2023, Korean Intellectual Property Office, Examiner Gi Jeong Jang, Daejeon, KR.

*Primary Examiner* — Danny Nguyen
*Assistant Examiner* — Nicolas Bellido
(74) *Attorney, Agent, or Firm* — Silver Legal LLC; Jarrett L. Silver; Brian C. Downing

(57) ABSTRACT

Devices, systems, and methods prevents backfeeding from a downstream residential power source into a commercial power grid when the commercial grid is de-energized. This helps prevent electrocution of line workers who are trying to restore power to the commercial grid such as when a consumer uses a misconfigured generator during a power outage. An indication may be provided when a consumer is attempting to backfeed on a de-energized commercial grid.

23 Claims, 12 Drawing Sheets

(56) References Cited

U.S. PATENT DOCUMENTS

| | | |
|---|---|---|
| 7,855,871 B2 | 12/2010 | Hudgins, Jr. et al. |
| 8,222,548 B2 | 7/2012 | Espeut, Jr. |
| 8,723,361 B2 | 5/2014 | Flegel |
| 9,083,173 B2 | 7/2015 | Nethery, III |
| 9,281,716 B2 | 3/2016 | Albsmeier et al. |
| 9,906,034 B2 | 2/2018 | Nethery |
| 2004/0169972 A1 | 9/2004 | Goss |
| 2006/0126241 A1* | 6/2006 | Unger ................. H02J 9/06 361/62 |
| 2007/0018506 A1 | 1/2007 | Park et al. |
| 2011/0057514 A1* | 3/2011 | Lathrop ................ G01D 4/002 307/64 |
| 2011/0175453 A1 | 7/2011 | Batzler et al. |
| 2013/0140904 A1* | 6/2013 | Flegel ................ A61M 25/0026 307/86 |
| 2017/0353025 A1 | 12/2017 | Phillips |
| 2017/0358919 A1* | 12/2017 | Smith ................. H02H 3/26 |
| 2018/0090922 A1* | 3/2018 | Phillips ................ H02H 3/003 |
| 2019/0190273 A1 | 6/2019 | Judkins et al. |
| 2025/0149885 A1* | 5/2025 | Phillips ................ H02H 1/0007 |

\* cited by examiner

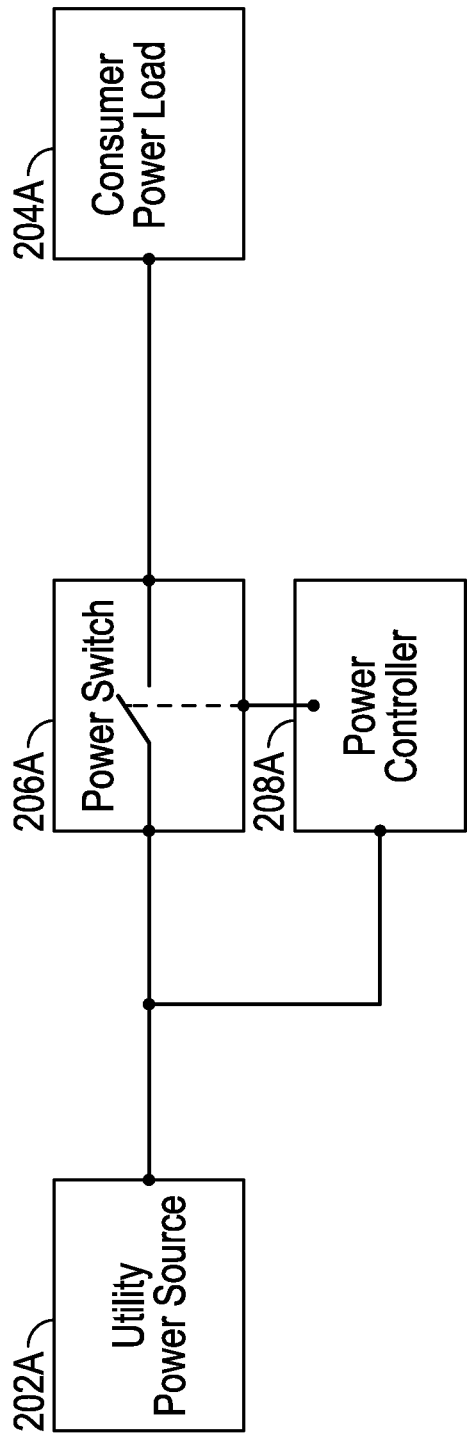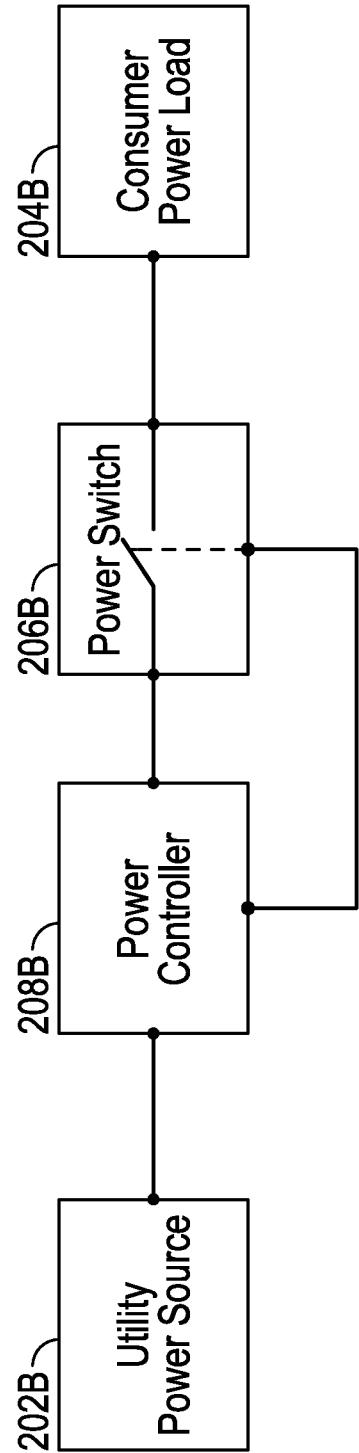

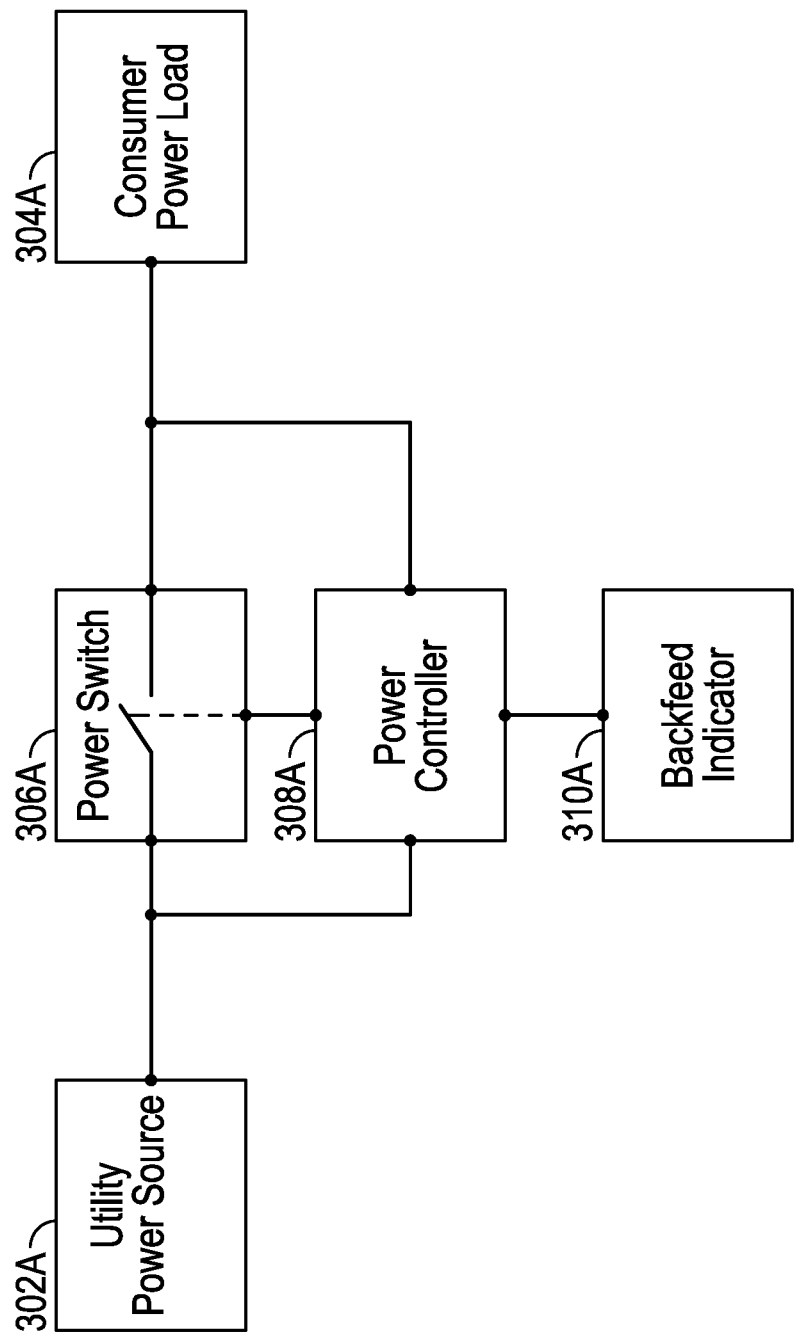

BACKFEED ELECTROCUTION
PREVENTION DEVICES, SYSTEMS AND
METHOD

CROSS-REFERENCE TO RELATED
APPLICATION

This application is a national stage application, filed under 35 U.S.C. § 371, of International Patent Application No. PCT/US2022/081046 filed on Dec. 6, 2022, which is incorporated by reference herein in its entirety.

FIELD OF THE INVENTION

The present technology is in the field of power generation protection and, more specifically, related to protecting a commercial power grid from being backfeed from consumer generated power while the commercial power grid is not providing power.

BACKGROUND

Devices like solar panels and generators can provide power from the consumer endpoints of the power grid. While utility workers perform operations on a de-energized commercial power generation grid, a danger to workers is a customer backfeeding power into the grid from a customer's power source. This backfeeding of power into the commercial grid can cause serious injury to line men and other utility workers including life threatening injuries.

SUMMARY

The disclosure teaches example devices, systems and methods that prevent a customer from backfeeding into a commercial power grid when the commercial grid is de-energized and save the lives of linemen. According to one or more embodiments, a device for backfeed protection includes a terminal for utility power that includes one or more power connections and one or more neutral connections; a terminal for consumer power that includes one or more power connections, and one or more neutral connections; a power switch including one or more control signal conductors for controlling the state of the switch and the switching being capable of transferring electrical power between the one or more power connections of the terminal for utility power and the one or more power connections of the terminal for consumer power, respectively, and the one or more neutral connections of the terminal for utility power and the one or more neutral connections of the terminal for consumer power, respectively; and a power controller configured to monitor the one or more power connections of the terminal for utility power and configured to generate one or more control signals on the one or more control signal conductors, wherein the power controller generates a control signal over the signal conductors to close the respective power switch when one or more power connections of the terminal for utility power are energized in reference to the one or more neutral connections of the terminal for utility power, and wherein the power control generates a control signal over the signal conductors to open the respective power switch when one or more power connections of the terminal for utility power is energized in reference to the one or more neutral connections of the terminal for utility power.

Described herein is an example device for backfeed protection. The device includes a terminal for utility power that includes one or more power connections, and one or more neutral connections; a terminal for consumer power that includes one or more power connections, and one or more neutral connections; a power switch including one or more conductor switches, and configured to receive one or more control signals for controlling the state of the switch. The one or more conductor switches are electrically connected between the one or more power connections of the terminal for utility power and the one or more power connections of the terminal for consumer power, respectively, and the one or more neutral connections of the terminal for utility power and the one or more neutral connections of the terminal for consumer power, respectively. The one or more control signals are configured to maintain each of the one or more conductor switches in an open or a closed state. When a conductor switch is in the closed state, electrical power can be transferred between the utility and consumer connections, and when a conductor switch is in the open state, electrical power cannot be transferred between the utility and consumer connections.

Also included in the example backfeed detection device is a power controller electrically connected to the power switch and electrically connected to the terminal for utility power. The power controller generates the one or more control signals for controlling the state of the switch. The power controller generates the one or more control signals to close one or more conductor switches when one or more power connections of the terminal for utility power are energized in reference to the one or more neutral connections of the terminal for utility power. The power controller generates the one or more control signals to open one or more conductor switches when one or more power connections of the terminal for utility power are de-energized in reference to the one or more neutral connections of the terminal for utility power.

Additionally or alternatively, the power controller generates control signals to stop transferring all electrical power when at least one of the power connections of the terminal for utility power is de-energized with reference to neutral connections of the terminal for utility power.

Additionally or alternatively, the example device includes a backfeed indicator electrically connected the power controller, wherein the power controller is further configured to monitor power connections of the terminal for consumer power and neutral connections of the terminal for consumer power, and signal the indicator when one of the power connections of the terminal for utility power is de-energized and when one or more power connections of the terminal for consumer power is attempting to backfeed.

Additionally or alternatively, the power controller generates control signals to stop transferring all electrical power when at least one of the power connections of the terminal for utility power is de-energized with reference to neutral connections of the terminal for utility power.

Additionally or alternatively, the backfeed indicator includes at least one of an illumination device, an audible device, and a signal to another device.

Additionally or alternatively, the power connections of terminal for utility power include utility line1 and utility line2; the neutral connections of the terminal for utility power include utility neutral; the power connections of terminal for consumer power include consumer line1 and consumer line2; the neutral connections of the terminal for consumer power include consumer neutral; wherein the backfeed indicator provides a single indication.

Additionally or alternatively, the indicator provides a valid indication when the consumer has reversed the polarity of the power connections of terminal for consumer power include consumer line1 and consumer line2; the neutral connections of the terminal for consumer power include consumer neutral.

Additionally or alternatively, the power connections of terminal for utility power include utility line1 and utility line2; the neutral connections of the terminal for utility power include utility neutral; the power connections of terminal for consumer power include consumer line1 and consumer line2; the neutral connections of the terminal for consumer power include consumer neutral; wherein the power controller includes a relay with a set of normally open contacts where the coil of the relay is connected between utility line1 and utility neutral, one terminal of the normally open contact of the relay is connected to utility line2, and the other terminal of the normally open contact of the relay generates the control signal.

Additionally or alternatively, the power controller includes a control coil, and the control coil is attached to at least one of the neutral connections of the terminal for utility power include utility neutral.

Additionally or alternatively, the power switch can individually control the transfer of electrical power between each of the one or more power connections of the terminal for utility power, the one or more power connections of the terminal for consumer power, the one or more neutral connections of the terminal for utility power, and the one or more neutral connections of the terminal for consumer power.

Another example device for backfeed protection includes a power controller; a device power line connecting a utility power conductor to a consumer power conductor with a device power line switch disposed along the device power line between the utility power conductor and the consumer power conductor; and a device neutral line connecting a utility neutral conductor to a consumer neutral conductor with a device neutral line switch disposed along the device neutral line between the utility neutral conductor and the consumer neutral conductor. The power controller is connected to the device power line and the device neutral line and senses when the utility power conductor is de-energized relative to a voltage of the utility neutral conductor. The power controller controls the device power line switch to allow current to flow across the device power line when the utility power conductor is energized. The power controller switch controls the device power line switch to prevent current from flowing across the device power line when the utility power conductor is de-energized.

Additionally or alternatively, the device power line includes a first device power line with a first device power line switch and a first utility power conductor and a second device power line with a second device power line switch and a second utility power conductor, and the power controller controls the first device power line switch and the second device power line switch to allow current to flow only on the first device power line when the first utility power conductor is energized relative to the voltage of utility neutral conductor.

Additionally or alternatively, the device power line includes a first device power line with a first device power line switch and a first utility power conductor and a second device power line with a second device power line switch and a second utility power conductor, and the power controller controls the first device power line switch and the second device power line switch to prevent current from flowing on the first device power line and the second device power line when either of the first utility power conductor the second utility power conductor is de-energized relative to the voltage of utility neutral conductor.

Additionally or alternatively, the power controller controls the device neutral line switch to prevent current from flowing across the neutral conductor when the utility power conductor is de-energized.

Additionally or alternatively, the device includes a backfeed indicator that indicates backfeed when the utility power conductor is de-energized and the consumer power conductor is energized.

Additionally or alternatively, the backfeed indicator includes at least one of an illumination device, an audible device, and a signal to another device.

Additionally or alternatively, the backfeed indicator indicates when the consumer neutral conductor is energized relative to the consumer power conductor.

Additionally or alternatively, the power controller includes a relay with a set of normally open contacts where a coil of the relay is connected between the first device utility power line and device utility neutral line, one terminal of the normally open contact of the relay is connected to second device utility power line, and another terminal of the normally open contact of the relay generates a control signal for controlling the first device power line conductor switch and the second device power line conductor switch.

Additionally or alternatively, the power controller includes a control coil, and the control coil is connected to the utility neutral conductor.

Additionally or alternatively, the device power line includes a first device power line with a first device power line switch, a first utility power conductor, and a first consumer power conductor, and a second device power line with a second device power line switch, a second utility power conductor, and a second consumer power conductor, and the power controller can individually control a transfer of electrical power between the first utility power conductor and the first consumer power conductor through the first device power line switch, a transfer of electrical power between the second utility power conductor and the second consumer power conductor through the second device power line switch, and a transfer of electrical power between the utility neutral conductor and the consumer neutral conductor through the device neutral line switch.

Also described is an example method of protecting a utility power source from backfeed from a consumer power source, the method comprising the steps of:

providing a device for backfeed protection containing a circuit that, without consumer interaction, prevents current from flowing from a consumer power source to a utility power source when a power line from a utility power source is de-energized relative to a neutral line from the utility power source; separating a service line at or near the point of delivery from the utility power source to the consumer power source creating an upstream power line and an upstream neutral line on a side of the utility power source and a downstream power line and a downstream neutral line on a side of the consumer power source; and connecting upstream terminals of the device to the upstream power line and the upstream neutral line and connecting downstream terminals of the device to the downstream power line and the downstream neutral line.

Also disclosed is a different example device for backfeed protection. The device includes: a terminal for utility power that includes one or more power connections and one or more neutral connections; a terminal for consumer power that includes one or more power connections, and one or more neutral connections; a power switch including one or more control signal conductors for controlling the state of the switch and the switching being capable of transferring electrical power between the one or more power connections of the terminal for utility power and the one or more power connections of the terminal for consumer power, respectively, and the one or more neutral connections of the terminal for utility power and the one or more neutral connections of the terminal for consumer power, respectively; wherein the respective power switch is open in the absence of a control signal over the signal conductors; and a power controller configured to monitor the one or more power connections of the terminal for utility power and configured to generate one or more control signals on the one or more control signal conductors, wherein the power controller generates the control signal over the signal conductors to close the respective power switch when one or more power connections of the terminal for utility power are energized in reference to the one or more neutral connections of the terminal for utility power.

Additionally or alternatively, the power controller draws power for the operations of the power controller solely from being connected with the utility power source and the consumer power source and without a battery.

BRIEF DESCRIPTION OF THE DRAWINGS

In order to more fully understand the invention, reference is made to the accompanying drawings or figures. The invention is described in accordance with the aspects and embodiments in the following description with reference to the drawings or figures, in which like numbers can represent the same or similar elements. Same or similar named elements corresponding to unique reference numerals can represent the same or similar elements or distinct elements, as would be understood by a person of skill in the art. Understanding that these drawings are not to be considered limitations in the scope of the invention, the presently described aspects and embodiments and the presently understood best mode of the invention are described with additional detail through use of the accompanying drawings.

FIG. 2A is a block diagram depicting an example backfeed protector with a power controller that measures utility power in parallel with the power lines.

FIG. 2B is a block diagram depicting another example backfeed protector with a power controller that measures utility power in series with the power lines. with a different configuration that that of FIG. 2A.

FIG. 3A is a block diagram depicting the example backfeed protector of FIG. 2A with an optional backfeed indicator.

In the example schematics and circuit diagrams above, the example backfeed protectors are understood to exclude the consumer power source and the utility power source that they are shown to be connected to. They optionally include hardware and/or wiring to be connectible to these power sources.

DETAILED DESCRIPTION

Backfeeding, in general, can be wanted and unwanted transfer of power from a consumer device to a commercial power grid. An example of unwanted backfeed is a consumer device (e.g., a generator) transferring power into the power grid when the power grid is de-energized. An example of wanted backfeed is when a solar panel system transfers excessive power into the power grid while the commercial grid is energized. A goal of the present disclosure is to prevent unwanted backfeed while optionally allowing wanted backfeed. As used herein, "backfeed," in general, means when a consumer device transfers power into a commercial grid that is at least partially de-energized unless the context clearly dictates otherwise. For example, backfeeding, as used herein, could be where a consumer is using a generator during a power outage to transfer electricity to a commercial grid.

Customers often neglect precautions to prevent backfeeding into the de-energized grid. For example, due to a natural disaster causing a power outage, a customer may improperly configure a generator in such a way as to cause power to backfeed into the commercial grid. A shortcut a homeowner could take is, instead of disconnecting the homes electrical circuit from the grid power before attaching a generator to the homes electrical circuit, the homeowner simply connects the generator into a house's electrical circuit connected to the grid thus backfeeding power into the commercial grid. For another example, a customer's alternative power source, such as a solar panel array, could backfeed electricity into the commercial grid.

A homeowner can improperly install the alternative power source such that backfeeding occurs on a de-energized grid. A lineman trying to restore power would incorrectly assume the de-energized grid's power line is not a live line or the line suddenly becomes live during restoring operations, and the lineman could get electrocuted.

A benefit of the example backfeed protection devices (also referred to as backfeed protectors) herein is that they can function as an automatic circuit interrupter that cuts off unwanted backfeed without needed consumer or power company intervention.

Figure 1:
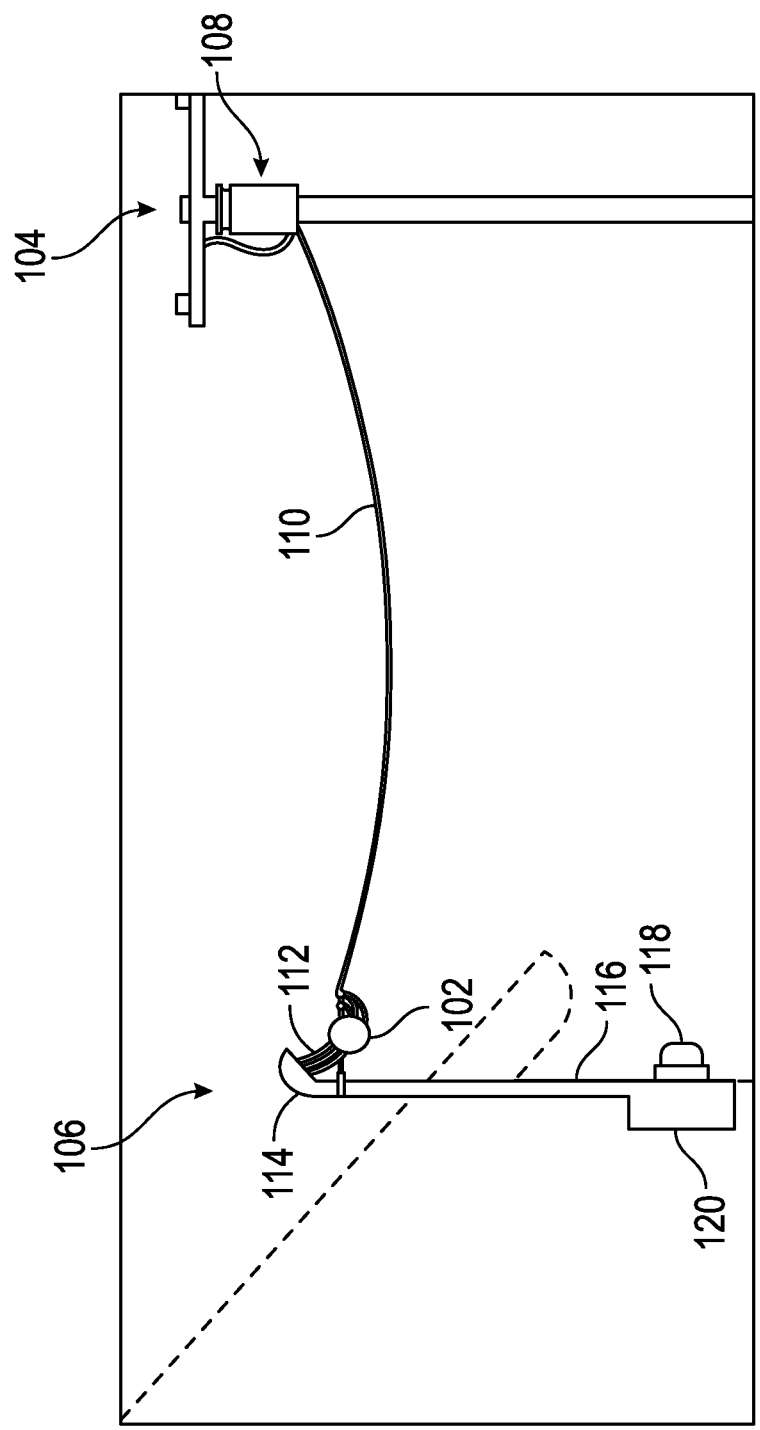
FIG. 1 is a macro-level illustration depicting an example power delivery system with backfeed protection.

FIG. 1 depicts an overview of typical power-grid-to-residential power delivery system connected through an example backfeed protection device 102, according to one or more embodiments, positioned on a drip loop of the service line 110. Backfeed protector 102 can be electrically connected between utility power source 104 and consumer power load 106. Utility power source 104 may include transformer 108 that steps down the voltage for residential usage. As used herein, a "power source" or "power load" refers to where power can be drawn from such as a power line from an energized power grid. The power grid can get its energy from any source such as a power plant (e.g., nuclear, gas, generator). For convenience of understanding, a "power source" or "power load" will be referred to regardless of whether the "power source" is energized or the "power load" is present. Utility power source 104 can be electrically connected with backfeed protector 102 via service line 110.

Point of delivery 112, in this example, is the location where the utility side transitions to the consumer side. In a residential setting, at the point of delivery where the weatherhead 114 meets the service line 110, the consumer side is understood to be the hardware and wiring downstream of the weatherhead including the power meter, circuit breaker, etc. The utility side is the hardware and wiring upstream of the weatherhead including the drip loop, the service line, transformer, etc. While "consumer" and "residence" are used throughout this specification, it is understood that the embodiments herein could also apply in some commercial settings. Consumer side may include weatherhead 114, electrical mast 116, meter 118, and meter box 120. The dotted line showing a residential roof is for explanatory purposes only and in no way affects the circuit or the interpretation of the location. Consumer side is generally downstream of the point of delivery while the utility side is generally upstream of the point of delivery. Consumer power load 106 is a reference numeral of convenience to include the power able to be drawn, if any, from the consumers hardware on the consumer side including any added devices such as generators or solar panels. According to one or more embodiments, point of delivery 112 may the point that electrically connects backfeed protector 102 to consumer power load 106.

Backfeed protector 102 may have an environmental and weather sealing and electrically insulative housing optionally where only the connectors and/or terminals and visible power or backfeed indicators can be seen. The housing optionally can protect the terminals and incoming lines of the backfeed protector from the weather and environment or it can leave those exposed. Additionally or alternatively, after the terminals of the backfeed protector 102 is connected to the appropriate lines, sprays, covers, flaps, or other added materials may be used to isolate or weather seal the connected terminals from the environment.

The backfeed protector can be placed in various places along this power delivery system with one example embodiment having a placement on the utility side. A utility company typically does not require a residence owner's permission to make an alteration on the utility side. This provides a benefit to the power company when the example device embodiments can be installed and operated on the utility side by a lineman without consumer intervention. One potential location to install the backfeed protector 102 is on the drip loop on the utility side, which has a naturally low spot. The housing of the backfeed protector 102 is optionally mechanically secured to the weatherhead 114 or electrical mast 116 to help protect against weather and other events.

According to one or more embodiments, backfeed protector 102 may prevent power from being transferred between consumer power load 106 and utility power source 104 when utility power source 104 is de-energized.

In some embodiments, backfeed protector 102 allows power to be transferred between consumer power load 106 and utility power source 104 when utility power source 104 is energized. For example, when utility power source 104 is energized, solar power generated at customer power load 106 is transferred to utility power source 104.

According to one or more embodiments, backfeed protector 102 may selectively allow backfeed on energized lines and the corresponding neutral lines while not allowing backfeed on de-energized lines and the corresponding neutral connection. For example, when utility power source 104 has power lines line1 (L1), line2 (L2), and neutral (N), if line1 is energized and line2 is de-energized, backfeed protector 102 may allow backfeed on line1 while not allowing backfeed on line2.

According to one or more embodiments, service line 110 may include any number of conducting wires or lines. For example, in a typical U.S.A. power delivery service configuration, service line 110 may include a line1 (L1), line2 (L2), and a neutral (N). For another example, service line 110 may include L1, L2, N, and ground (GND). According to one or more embodiments, backfeed protector 102 may have one or more connectors or terminals for each conductor of service line 110 and/or point of delivery 112, and one or more terminals for consumer power load 106. Unless a specific interpretation is limited by the context, terminals and connectors can be used interchangeably in this specification. Unless a specific interpretation is limited by the context, conductors, wires, and lines can be used interchangeably in this specification.

The example backfeed protectors can be used in multiple situations. Though FIG. 1 shows an overhead power delivery service, any power delivery service may use backfeed protector 102. For example, backfeed protector 102 is useable in an underground power delivery service. While backfeed protector 102 is shown on the utility side close to the point of delivery 112 in FIG. 1, a person of skill in the art would appreciate that one or more backfeed protectors 102 may be installed at any point within utility power source 104 and consumer power load 106 (e.g., from a power station to within a residence). Backfeed protector 102 could even come standard as part of a generator hookup. Multiple backfeed protectors 102 could be used simultaneously to add a measure of safety throughout the commercial delivery all the way through the residential delivery.

According to one or more embodiments, backfeed protector 102 may have a connector to electrically connect utility power source 104 to the backfeed protector 102 and consumer power load 106 to the backfeed protector 102. These could be any kind of now known or later developed commercially available connector or terminal. For example, the connector may be a terminal with screws for each line. According to one or more embodiments, the connector may include multiple connectors. For example, a first connector could be for the utility power lines (e.g., L1, L2, and N), and a second connector could be for the consumer power lines (e.g., L1, L2, and N). According to one or more embodiments, backfeed protector 102 may have electrical wires protruding from backfeed protector 102. For example, when backfeed protector 102 is installed, the wires protruding from the backfeed protector 102 could be spliced into utility lines L1, L2, and N, and consumer lines L1, L2, and N.

Now that the backfeed protector concept has been introduced, the backfeed protector's component functionality will be discussed at a high level and then in more detailed wire level schematics.

FIG. 2A is a block diagram depicting an example backfeed protector with a power controller that measures utility power in parallel with the power lines. Power switch 206A may be electrically connected to utility power source 202A and consumer power load 204A. Power controller 208A may be electrically connected to utility power source 202A and power switch 206A.

According to one or more embodiments, power controller 208A may monitor the utility power source 202A and control power switch 206A. Power switch 206A may be a normally open ("NO") switch where the utility power source 202A and consumer power load 204A may be electrically disconnected when a control signal is not applied to the power switch 206A. Once utility power source 202A is energized, power controller 208A may detect that utility power source 202A is delivering power and command the closure of power switch 206A via the control signal. For example, power controller 208A may generate a voltage as the control signal that causes power switch 206A to close.

According to one or more embodiments, the electrical connections between utility power source 202A, consumer power load 204A, power switch 206A, and power controller 208A may each be any number of lines. For example, an electrical connection between utility power source 202A and power switch 206A may include lines line1, line2, and neutral, and an electrical connection between power controller 208A and power switch 206A may be a single line. According to one or more embodiments, the power controller 208A may detect when multiple lines are energized before closing the power switch 206A. For example, the power controller 208A may detect line1 and line2 are energized before closing the power switch 206A for every line of the consumer power load 204A. For a more detailed example, if line1 is energized and line2 is de-energized, then the power switch 206A may be open for line1, line2 and neutral.

According to one or more embodiments, power switch 206A may include a switch for each line from utility power source 202A. For example, when the utility power source 202A has lines line1, line2, and neutral, the power switch 206A may include a separate switch for each line line1, line2, and neutral with the ability to control each switch independently.

According to one or more embodiments, the power controller 208A may independently control each switch within power switch 206A. For example, when line1 is energized and line2 is de-energized, the power switch 206A may close the line1 switch while leaving the line2 switch open.

According to one or more embodiments, power switch 206A and power controller 208A may include one or more contactors. Additionally or alternatively, power switch 206A and power controller 208A may include one or more relays. According to one or more embodiments, power switch 206A and power controller 208A may include any combination of contactors and relays.

According to one or more embodiments, utility power source 202A may be the same or similar as utility power source 104. According to one or more embodiments, consumer power load 204A may be the same or similar as consumer power load 106. According to one or more embodiments, backfeed protector 102 may include power switch 206A and power controller 208A.

Whereas the backfeed protector in FIG. 2A was in parallel, FIG. 2B is a block diagram depicting another example backfeed protector with a power controller that measures utility power in series with the power lines. Power switch 206B may be electrically connected to power controller 208B and consumer power load 204B. Power controller 208B may be electrically connected to utility power source 202B and power switch 206B. Power that is transferred between utility power source 202B and consumer power load 204B may pass through power controller 208B. For example, power controller 208B may be a low impedance path between utility power source 202B and power switch 206B.

According to one or more embodiments, utility power source 202B may be the same or similar as utility power source 104. According to one or more embodiments, consumer power load 204B may be the same or similar as consumer power load 106. According to one or more embodiments, backfeed protector 102 may include power switch 206B and power controller 208B. According to one or more embodiments, power switch 206A may include power switch 206B. According to one or more embodiments, power controller 208A may include power controller 208B.

According to one or more embodiments, a power controller may include a combination of power controller 208A and power controller 208B.

Now the concept of optional indicator(s) will be discussed in reference to FIG. 3A and the later figures. According to one or more embodiments, backfeed protector may include an indicator such as a light, sound, or otherwise to indicate when the utility power source is de-energized and the consumer power load is attempting to backfeed power into utility power source. For example, when utility power source is de-energized and consumer power load is attempting to backfeed power into utility power source 104, the backfeed protector may illuminate a light.

FIG. 3A depicts the example backfeed protector of FIG. 2A with an optional backfeed indicator 310A. Power switch 306A may be electrically connected to utility power source 302A and consumer power load 304A. Power controller 308A may be electrically connected to utility power source 302A, consumer power load 304A, power switch 306A, and backfeed indicator 310A.

According to one or more embodiments, power controller 308A may monitor the utility power source 302A and control power switch 306A. Power controller 308A may close power switch 306A once utility power source 302A is energized. According to one or more embodiments, power controller 308A may monitor utility power source 302A and consumer power load 304A. When utility power source 302A is de-energized and consumer power load 304 is backfeeding power from an alternative power source, power controller 308A may provide a signal to backfeed indicator 310A that the consumer power load 304A is attempting to backfeed utility power source 302A.

According to one or more embodiments, backfeed indicator 310 may provide an indication that consumer power load 304A is attempting to backfeed utility power source 302A. Backfeed indicator 310A may be an illumination device, such as, an incandescent light, a light emitting diode (LED), any device capable of illuminating or indicating, and any combination of the aforementioned. Additionally or alternatively, backfeed indicator 310A may be an audible device, such as, a horn, a buzzer, a chirp device, any device capable of emitting a sound, and any combination of the aforementioned. The indications can be used to signal to a lineman, a power company and/or the consumer. Backfeed indicator 310A may be a signal to another device, such as, a device capable of relaying the indication via a wireless network to a utility command center. Backfeed indicator 310A may include any combination of illumination device, audible device, and indication signal. For example, during a backfeed event when the utility power source 302A is de-energized, the indication may include illuminating a light and sounding a buzzer. For another example, during a backfeed event when the utility power source 302A is de-energized, the indication may include illuminating a light, sounding a buzzer, and generating a signal that a backfeed event is occurring.

The indication may also include an irreversible indicator, such as a sensor or other irreversible circuit element, where once triggered, the consumer power source or residence is recorded by the backfeed protector as having provided an impermissible backfeed. This indication could then be submissible as evidence in a legal proceeding.

According to one or more embodiments, utility power source 302A may be the same or similar as utility power source 104. According to one or more embodiments, consumer power load 304A may be the same or similar as consumer power load 106.

According to one or more embodiments, backfeed protector 102 may include power switch 306A, power controller 308A, and backfeed indicator 310A. According to one or more embodiments, power switch 206A may include power switch 306A. According to one or more embodiments, power controller 208A may include power controller 308B.

Figure 3B:
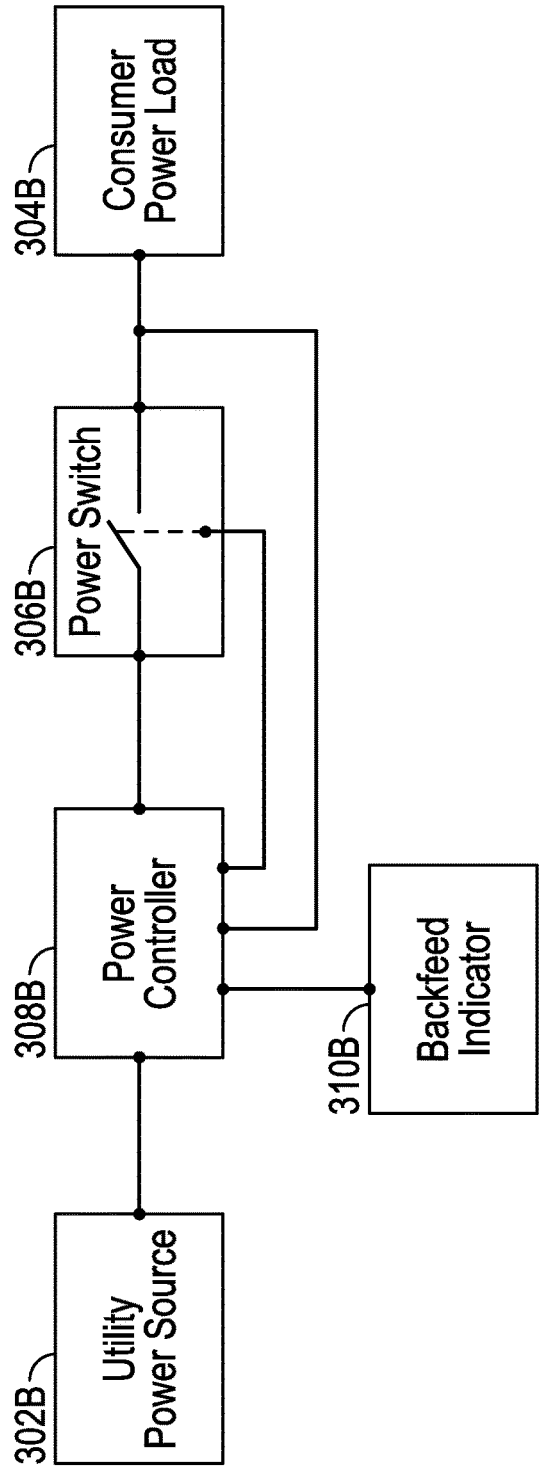
FIG. 3B is a block diagram depicting the example backfeed protector of FIG. 2B with an optional backfeed indicator.

FIG. 3B depicts the example backfeed protector of FIG. 2B with an optional backfeed indicator. Power switch 306B may be electrically connected to power controller 308B and consumer power load 304B. Power controller 308B may be electrically connected to utility power source 302B, consumer power load 304B, power switch 306B, and backfeed indicator 310B. Power that is transferred between utility power source 302B and consumer power load 304B may pass through power controller 308B.

According to one or more embodiments, utility power source 302B may be the same or similar as utility power source 104. According to one or more embodiments, consumer power load 304B may be the same or similar as consumer power load 106. According to one or more embodiments, backfeed protector 102 may include power switch 306B, power controller 308B, and backfeed indicator 310B. According to one or more embodiments, power switch 206A may include power switch 306B. According to one or more embodiments, power controller 208B may include power controller 308B. According to one or more embodiments, backfeed indicator 310A may include backfeed indicator 310B.

Figure 3C:
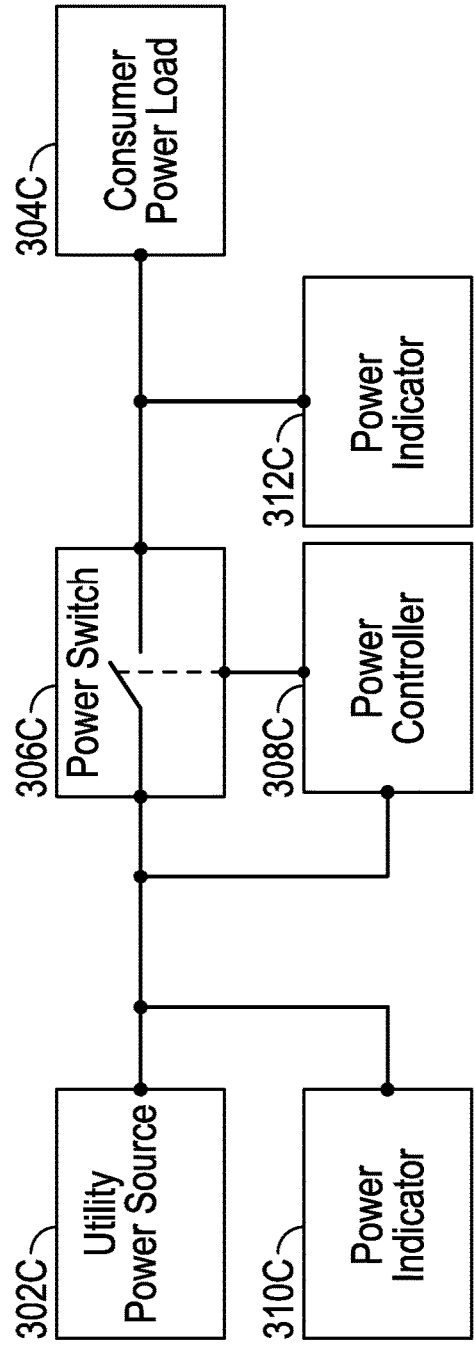
FIG. 3C is a block diagram depicting another example backfeed protector with power indicators to indicate when a line is energized.

As an alternative to indicating the presence of backfeed, FIG. 3C shows a simple example power indicator layout used as a status of each energized line. For example, if a line is energized, an indicator such as a light may shine. A power indicator can be on each of the utility side and the consumer side and on each line.

Here, power switch 306C may be electrically connected to utility power source 302C and consumer power load 304C. Power controller 308C may be electrically connected to utility power source 302C and power switch 306C. Power indicator 310C may be electrically connected to utility power source 302C. Power indicator 312C may be electrically connected to consumer power load 304C.

According to one or more embodiments, power indicator 310C may provide an indication that utility power source 302C is energized. For example, when utility power source 302C is energized, a light may be illuminated. According to one or more embodiments, when utility power source 302C has multiple lines, a separate power indicator 310 may be electrically connected to each line that provides power. For example, when utility power source 302C has line1, line2, and neutral, then a power indicator 310C may be electrically connected between line1 and neutral, and another power indicator 310C may be electrically connected between line2 and neutral.

According to one or more embodiments, power indicator 312C may provide an indication that consumer power load 304C is energized. For example, when consumer power load 304C is energized, a light may be illuminated. According to one or more embodiments, when consumer power load 304C has multiple lines, a separate power indicator 312C may be electrically connected to each powered line. For example, when consumer power load 304C has line1, line2 and neutral, then a power indicator 312C may be electrically connected between line1 and neutral, and another power indicator 312C may be electrically connected between line2 and neutral.

According to one or more embodiments, utility power source 302C may be the same or similar as utility power source 104. According to one or more embodiments, consumer power load 304C may be the same or similar as consumer power load 106.

According to one or more embodiments, backfeed protector 102 may include power switch 306C, power controller 308C, power indicator 310C, and power indicator 312C. According to one or more embodiments, power switch 206A may include power switch 306C. According to one or more embodiments, power controller 208A may include power controller 308C. According to one or more embodiments, backfeed indicator 310A may include power indicator 310C and power indicator 312C.

Figure 4A:
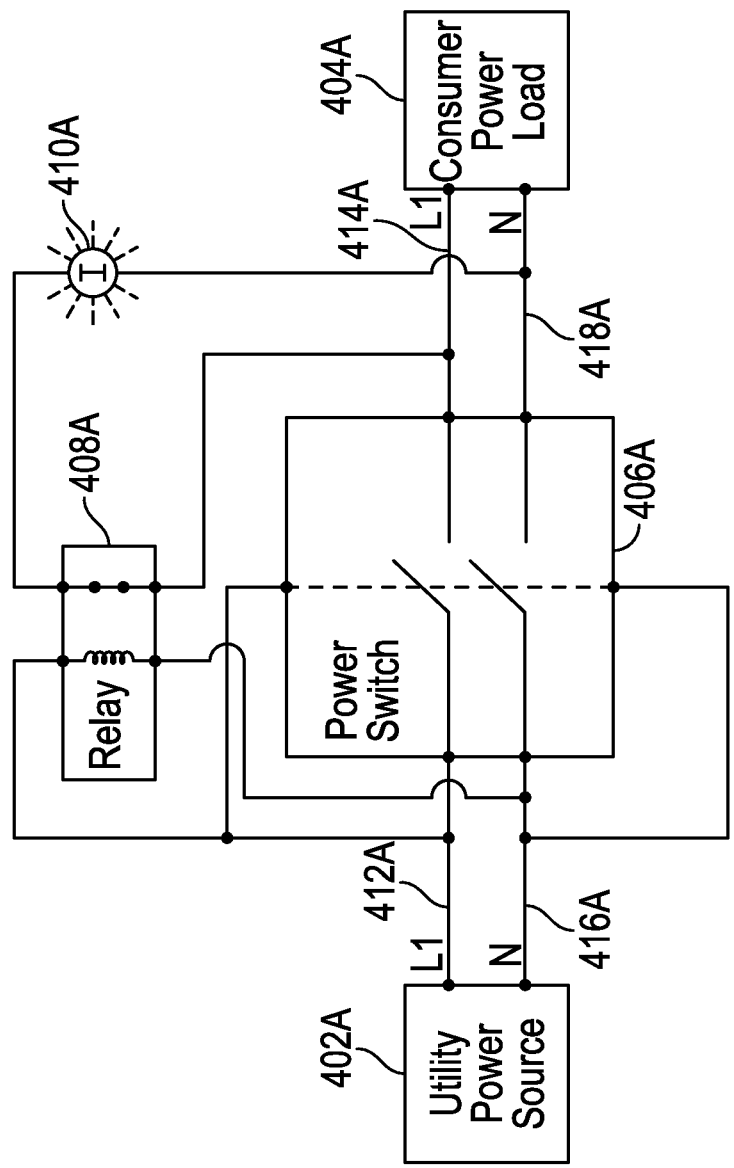
FIG. 4A is a wiring schematic depicting an example implementation of the backfeed protector of FIG. 3A with a single energized conductor.

Now that the concepts have been discussed, example embodiments with detailed wiring schematics will discussed. FIG. 4A is a wiring schematic depicting an example implementation of the backfeed protector of FIG. 3A with a single energized conductor. Utility power source 402A may have line1 412A and neutral 416A and be electrically connected to power switch 406A via line1 412 and neutral 416A. For example, line1 412A can be a 120 VAC RMS power source with reference to neutral 416a. Power switch 406A may be normally open, and have a control coil set of contacts, a first set of normally open contacts, and a second set of normally open contacts. A first terminal of the control coil of power switch 406A may be electrically connected to line1 412A and a second terminal of the control coil of power switch 406A may be electrically connected to neutral 416A. A first terminal of the first set of normally open contacts of power switch 406A may be electrically connected to line1 412A and a second terminal of the first set of normally open contacts of power switch 406A may be electrically connected to line1 414A. A first terminal of the second set of normally open contacts of power switch 406A may be electrically connected to neutral 416A and a second terminal of the second set of normally open contacts of power switch 406A may be electrically connected to neutral 418A. Relay 408A may have a control coil set of contacts and a first set of normally closed contacts. Relay 408A may have a first terminal of the control coil electrically connected to line1 412A and a second terminal of the control coil electrically connected to neutral 416A. Indicator 410A may have a first terminal and a second terminal. A first terminal of the first set of normally closed contacts of relay 408A may be electrically connected to line1 414A and a second terminal of the first set of normally closed contacts of relay 408A may be electrically connected to the first terminal of indicator 410A. Consumer power load 404A may have line1 414A and neutral 418A and be electrically connected to power switch 406A via line1 414A and neutral 418A. The second terminal of indicator 410A may be electrically connected to neutral 418A.

According to one or more embodiments, when utility power source 402A is energized, power switch 406 may be closed due to line1 412 energizing the control coil of power switch 406A. The closure of power switch 406 may allow power to transfer between utility power source 402A and consumer power load 404A via line1 412A and neutral 416A. As the control coil of relay 408A may be energized by line1 412A, indicator 410A may not illuminate due to the relays open contacts not allowing power to reach indicator 410A.

According to one or more embodiments, when the utility power source 402A is de-energized, power switch 406A may be open due to the control coil not being energized. As such, utility power source 402A and consumer power load 404A may be electrically disconnected. When consumer power load 404A has potential backfeed conditions, such as a consumer unintentionally energizing line1 414A using a generator, indicator 410A may illuminate due to power from line1 414A reaching indicator 410A through the normally closed contacts of relay 408A. In the alternative, when the consumer power load 404A is not energizing line1 414A, indicator 410A may not illuminate as there is no power reaching indicator 410A. According to one or more embodiments, line1 412A and neutral 416A may be electrically disconnected by power switch 406A.

According to one or more embodiments, indicator 410A may illuminate when consumer power load 404A is backfeeding and reverses the polarity of line1 414A and neutral 418A. For example, instead of a homeowner connecting consumer line1 to utility line1 and consumer neutral to utility neutral, the consumer connects consumer line1 to utility neutral and consumer neutral to utility line1.

According to one or more embodiments, utility power source 402A may be the same or similar as utility power source 104. According to one or more embodiments, consumer power load 404A may be the same or similar as consumer power load 106. According to one or more embodiments, backfeed protector 102 may include power switch 406A, relay 408A, and indicator 410A. According to one or more embodiments, power controller 208A may include relay 408A. According to one or more embodiments, backfeed indicator 310A may include indicator 410A. If a referenced indicator is not specified in this specification, it could be a backfeed indicator, a power indicator, or otherwise, or a combination of multiple types of indicators. A person of skill in the art would appreciate that changes of the indicator may change wiring.

Figure 4B:
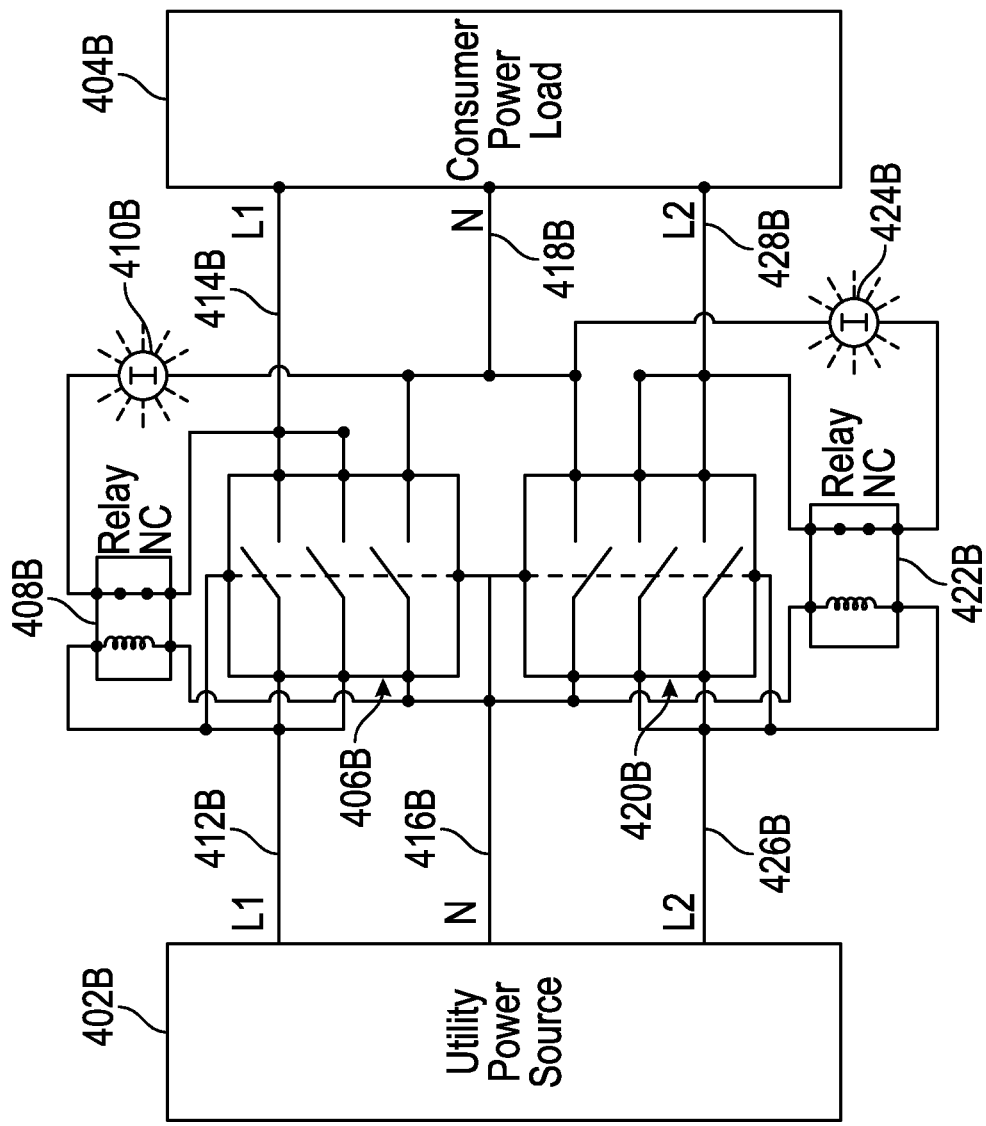
FIG. 4B is a wiring schematic depicting an example implementation of the backfeed protector of FIG. 3A but with two energized conductors.

Referring now to FIG. 4B, an example backfeed protector schematic with two energized conductors is shown, according to one or more embodiments. In this example, utility power source 402B has line1 412B, line2 426B, and neutral 416B, and is electrically connected with power switch 406B and power switch 420B via line1 412B, line2 426B, and neutral 416A. For example, line1 412B can be a 120 VAC RMS power source with reference to neutral 416B, and line2 426B can be a 120 VAC RMS power source with reference to neutral 416B where line2 426B is out of phase with line1 412B to create 220 VAC RMS.

Power switch 406B may be normally open, and have a control coil set of contacts, a first set of normally open contacts, a second set of normally open contacts, and a third set of normally open contacts. A first terminal of the control coil of power switch 406A may be electrically connected to line1 412B and a second terminal of the control coil of power switch 406B may be electrically connected to neutral 416B. A first terminal of the first set of normally open contacts of power switch 406B may be electrically connected to line1 412B and a second terminal of the first set of normally open contacts of power switch 406B may be electrically connected to line1 414B. A first terminal of the second set of normally open contacts of power switch 406B may be electrically connected to line1 412B and a second terminal of the second set of normally open contacts of power switch 406A may be electrically connected to line1 414B. The first and second set of contacts of power switch 406B may be electrically connected together to allow more current through the power switch 406B. A first terminal of the third set of normally open contacts of power switch 406B may be electrically connected to neutral 416B and a second terminal of the second set of normally open contacts of power switch 406B may be electrically connected to neutral 418A. Relay 408B allows indicator 410B to turn on when the utility power is down while the consumer load is attempting to backfeed. Relay 408B may have a control coil set of contacts and a first set of normally closed contacts. A first terminal of the control coil of relay 408B may be electrically connected to line1 412B and a second terminal of the control coil of relay 408B may be electrically connected to neutral 416B. Indicator 410B may have a first terminal and a second terminal. A first terminal of the first set of normally closed contacts of relay 408B may be electrically connected to line1 414B and a second terminal of the first set of normally closed contacts of relay 408B may be electrically connected to the first terminal of indicator 410B. Consumer power load 404B may have line1 414B and neutral 418B, and be electrically connected to power switch 406B via line1 414B and neutral 418B. The second terminal of indicator 410B may be electrically connected to neutral 418B.

If the relay does not have power on the coil then the contacts will be closed. If the relay has power on the coil, the contact will be open. When utility line1 is powered up, the contacts that go between indicator 410B and power switch 406B will be open which will keep the indicator 410B from illuminating do to the open contacts not allowing current to flow through the illuminator. If utility line1 is powered down and consumer L1 is also powered down (i.e., not backfeeding), then there is no power to illuminate 410B even though the contacts of 408B is closed. If utility line1 is powered down and consumer line1 is backfeeding then the relay contacts could be closed and there would be power to illuminate illuminator 410A.

Power switch 420B may be normally open, and have a control coil set of contacts, a first set of normally open contacts, a second set of normally open contacts, and a third set of normally open contacts. A first terminal of the control coil of power switch 420B may be electrically connected to line2 426B and a second terminal of the control coil of power switch 420B may be electrically connected to neutral 416B. A first terminal of the first set of normally open contacts of power switch 420B may be electrically connected to line2 426B and a second terminal of the first set of normally open contacts of power switch 420B may be electrically connected to line2 428B. A first terminal of the second set of normally open contacts of power switch 420B may be electrically connected to line2 426B and a second terminal of the second set of normally open contacts of power switch 420B may be electrically connected to line2 428B. The first and second set of contacts of power switch 420B may be electrically connected together to allow more current through the power switch 420B. A first terminal of the third set of normally open contacts of power switch 420B may be electrically connected to neutral 416B and a second terminal of the second set of normally open contacts of power switch 420B may be electrically connected to neutral 418B. Relay 422B may have a control coil set of contacts and a first set of normally closed contacts. Relay 422B may have a first terminal of the control coil electrically connected to line2 426B and a second terminal of the control coil electrically connected to neutral 416B. Indicator 424B may have a first terminal and a second terminal. A first terminal of the first set of normally closed contacts of relay 422B may be electrically connected to line2 428B and a second terminal of the first set of normally closed contacts of relay 422B may be electrically connected to the first terminal of indicator 424B. Consumer power load 404B may have line2 428B and neutral 418B and be electrically connected to power switch 420B via line2 428B and neutral 418B. The second terminal of indicator 424B may be electrically connected to neutral 418B.

According to one or more embodiments, when utility power source 402B is energizing line1 412B, power switch 406B may be closed due to line1 412B energizing the control coil of power switch 406B. The closure of power switch 406B may allow power to transfer between utility power source 402B and consumer power load 404B via line1 412B and neutral 416B. As the coil of relay 408B is energized by line1 412B, indicator 410B may not illuminate due to the first set of normally open contacts of relay 408B not allowing power to reach indicator 410B.

According to one or more embodiments, when the utility power source 402B is de-energized on line1 412B, power switch 406B may be open due the control coil not being energized. As such, utility power source 402B and consumer power load 404B may be electrically disconnected from line1 412B. When consumer power load 404B attempts to backfeed line1 414B, such as by energizing line1 414B using a generator, indicator 410B may illuminate due to power reaching indicator 410B through the first set of normally closed contacts of relay 408B. In the alternative, when the consumer power load 404B is not energizing line1 414B, indicator 410B may not illuminate as there is no power reaching indicator 410B. According to one or more embodiments, line1 412B and neutral 416B may be electrically disconnected by power switch 406B.

According to one or more embodiments, when utility power source 402B is energizing line2 426B, power switch 420B may be closed due to line2 426B energizing the control coil of power switch 420B. The closure of power switch 420B may allow power to transfer between utility power source 402B and consumer power load 404B via line2 426B and neutral 416B. As the coil of relay 422B is energized by line2 426B, indicator 424B may not illuminate due to the relays open contacts not allowing power to reach indicator 424B.

According to one or more embodiments, when the utility power source 402B is de-energized on line2 426B, power switch 420B may be open due the control coil not being energized. As such, utility power source 402B and consumer power load 404B may be electrically disconnected for line2 426B. When consumer power load 404B attempts to backfeed line2 428B, such as by energizing line2 428B using a generator, indicator 424B may illuminate due to power from line2 reaching indicator 424B. In the alternative, when the consumer power load 404B is not energizing line2 428B, indicator 424B may not illuminate as there is no power reaching indicator 424B. According to one or more embodiments, line2 426B and neutral 416B may be electrically disconnected by power switch 420B.

According to one or more embodiments, the backfeed protection and indication circuit provided by power switch 406B, relay 408B and indicator 410B, may perform independently of power switch 420B, relay 422B, and indicator 424B. For example, when line1 412B is de-energized power switch 406B may be open thus potentially stopping power from transferring between line1 412B and line1 414B, and line2 426B may be energized to close power switch 420B to transfer power from line2 426B and line2 428B.

According to one or more embodiments, power switch 406B, relay 408B, and indicator 410B may perform a similar function as power switch 406A, relay 408A, Indicator 410A, respectively. According to one or more embodiments, power switch 420B, relay 422B, and indicator 424B may perform a similar function as power switch 406A, relay 408A, indicator 410A, respectively, except power switch 420B, relay 422B, and indicator 424B may be electrically connected to line2 426B and line2 428B.

According to one or more embodiments, though FIG. 4B shows line1 412B and line2 726B, a person of skill in the art would appreciate that the circuit can be extended to cover additional power lines (e.g., line3, line4, etc.).

According to one or more embodiments, indicator 410B may illuminate when consumer power load 404B is backfeeding and reverses the polarity of line1 414B and neutral 418B. For example, instead of a homeowner connecting consumer line1 to utility line1 and consumer neutral to utility neutral, the consumer connects consumer line1 to utility neutral and consumer neutral to utility line1. According to one or more embodiments, indicator 424B may illuminate when consumer power load 404B is backfeeding and reverses the polarity of line2 428B and neutral 418B. For example, instead of a homeowner connecting consumer line2 to utility line2 and consumer neutral to utility neutral, the consumer connects consumer line2 to utility neutral and consumer neutral to utility line2.

According to one or more embodiments, utility power source 402B may be the same or similar as utility power source 104. According to one or more embodiments, consumer power load 404B may be the same or similar as consumer power load 106. According to one or more embodiments, backfeed protector 102 may include power switch 406B, relay 408B, indicator 410B, power switch 420B, relay 422B, and indicator 424B. According to one or more embodiments, power controller 208A may include relay 408B and relay 422B. According to one or more embodiments, backfeed indicator 310A may include indicator 410B and indicator 424B.

Figure 5:
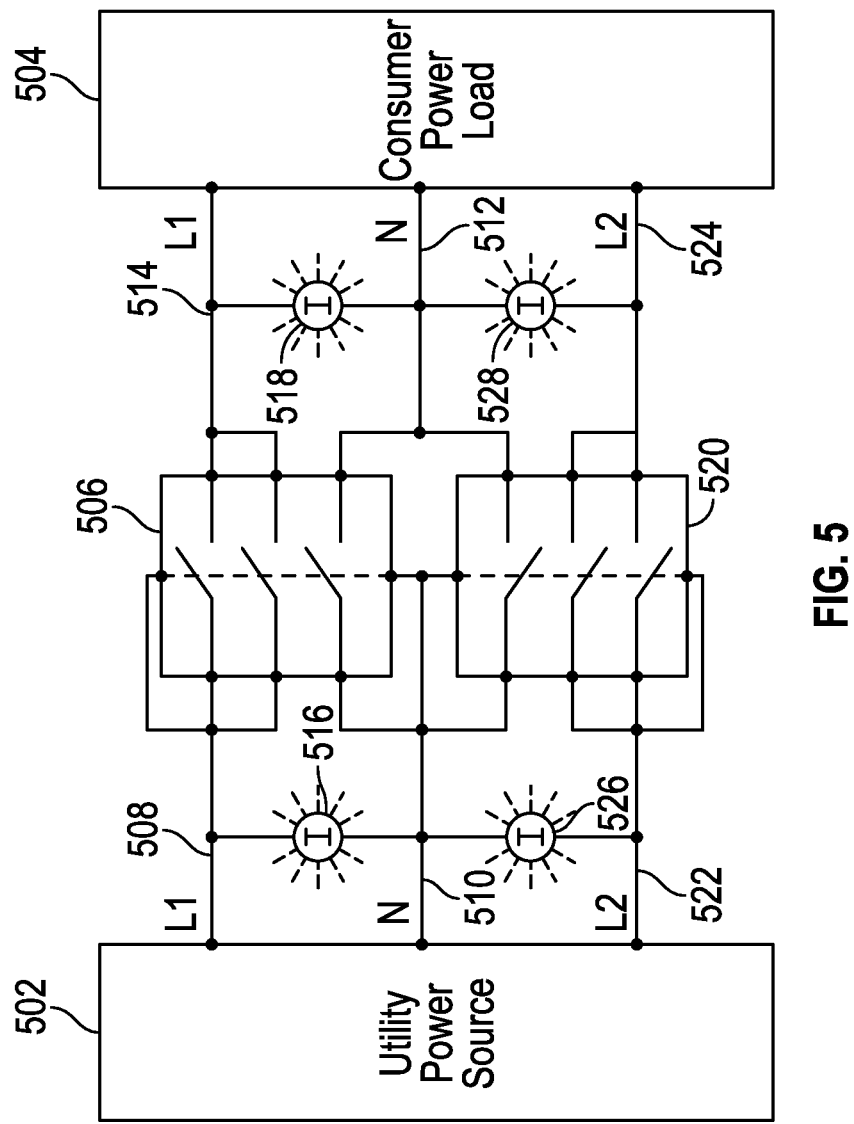
FIG. 5 is a wiring schematic depicting an example implementation of the backfeed protector of FIG. 3C.

Referring now to FIG. 5, an example backfeed protector schematic is shown, according to one or more embodiments. Utility power source 502 may have line1 508, line2 522, and neutral 510, and be electrically connected with power switch 506 and power switch 520 via line1 508, line2 522, and neutral 510. For example, line1 508 can be a 120 VAC RMS power source with reference to neutral 510, and line2 522 can be a 120 VAC RMS power source with reference to neutral 510 where line2 522 is out of phase with line1 508 to create 220 VAC RMS.

Power switch 506 may be normally open, and have a control coil set of contacts, a first set of normally open contacts, a second set of normally open contacts, and a third set of normally open contacts. A first terminal of the control coil of power switch 506 may be electrically connected to line1 508 and a second terminal of the control coil of power switch 506 may be electrically connected to neutral 510. A first terminal of the first set of normally open contacts of power switch 506 may be electrically connected to line1 508 and a second terminal of the first set of normally open contacts of power switch 506 may be electrically connected to line1 514. A first terminal of the second set of normally open contacts of power switch 506 may be electrically connected to line1 508 and a second terminal of the second set of normally open contacts of power switch 506 may be electrically connected to line1 514. The first and second set of contacts of power switch 506 may be electrically connected together to allow more current through the power switch 506. A first terminal of the third set of normally open contacts of power switch 506 may be electrically connected to neutral 510 and a second terminal of the second set of normally open contacts of power switch 506 may be electrically connected to neutral 512. Consumer power load 504 may have line1 514 and neutral 512 and be electrically connected to power switch 506 via line1 514 and neutral 512. Indicator 516 may have a first terminal and a second terminal. The first terminal of indicator 516 may be electrically connected to line1 508 and the second terminal of indicator 516 may be electrically connected with neutral 516. Indicator 518 may have a first terminal and a second terminal. The first terminal of indicator 518 may be electrically connected to line1 514 and the second terminal of indicator may be electrically connected with neutral 512.

Power switch 520 may be normally open, and have a control coil set of contacts, a first set of normally open contacts, a second set of normally open contacts, and a third set of normally open contacts. A first terminal of the control coil of power switch 520 may be electrically connected to line2 522 and a second terminal of the control coil of power switch 520 may be electrically connected to neutral 510. A first terminal of the first set of normally open contacts of power switch 520 may be electrically connected to line2 522 and a second terminal of the first set of normally open contacts of power switch 520 may be electrically connected to line2 524. A first terminal of the second set of normally open contacts of power switch 520 may be electrically connected to line2 522 and a second terminal of the second set of normally open contacts of power switch 520 may be electrically connected to line2 524. The first and second set of contacts of power switch 520 may be electrically connected together to allow more current through the power switch 520. A first terminal of the third set of normally open contacts of power switch 520 may be electrically connected to neutral 510 and a second terminal of the second set of normally open contacts of power switch 520 may be electrically connected to neutral 512. Consumer power load 504 may have line2 524 and neutral 512 and be electrically connected to power switch 520 via line2 524 and neutral 512. Indicator 526 may have a first terminal and a second terminal. The first terminal of indicator 526 may be electrically connected to line2 522 and the second terminal of indicator 526 may be electrically connected with neutral 510. Indicator 528 may have a first terminal and a second terminal. The first terminal of indicator 528 may be electrically connected to line2 524 and the second terminal of indicator may be electrically connected with neutral 512.

According to one or more embodiments, power switch 506 and/or power switch 520, may be replaced with a power switch that has two normally open contacts and the redundant connection of lines, such as the second line1 508, may be removed.

According to one or more embodiments, when utility power source 502 is energizing line1 508, power switch 506 may be closed due to line1 508 energizing the control coil of power switch 506. The closure of power switch 506 may allow power to transfer between utility power source 502 and consumer power load 504 via line1 508 and neutral 510. Indicator 516 may illuminate when line1 508 is energized in reference to neutral 516. Indicator 518 may illuminate when line1 514 is energized in reference to neutral 512.

According to one or more embodiments, when utility power source 502 is energizing line2 522, power switch 520 may be closed due to line2 522 energizing the control coil of power switch 520. The closure of power switch 520 may allow power to transfer between utility power source 502 and consumer power load 504 via line2 522 and neutral 510. Indicator 526 may illuminate when line2 522 is energized in reference to neutral 516. Indicator 528 may illuminate when line2 522 is energized in reference to neutral 512.

According to one or more embodiments, indicator 518 may illuminate when consumer power load 504 is backfeeding and reverses the polarity of line1 514 and neutral 512. For example, instead of a homeowner connecting consumer line1 to utility line1 and consumer neutral to utility neutral, the consumer connects consumer line1 to utility neutral and consumer neutral to utility line1. According to one or more embodiments, indicator 528 may illuminate when consumer power load 504 is backfeeding and reverses the polarity of line2 524 and neutral 512. For example, instead of a homeowner connecting consumer line2 to utility line2 and consumer neutral to utility neutral, the consumer connects consumer line2 to utility neutral and consumer neutral to utility line2.

According to one or more embodiments, though FIG. 5 shows line1 508 and line2 522, a person of skill in the art would appreciate that the circuit can be extended to cover additional power lines (e.g., line3, line4, etc.).

According to one or more embodiments, when line1 508 is de-energized, power switch 506 may be open thus potentially preventing power from being transferred between utility power source 502 and consumer power load 504 via line1 508. According to one or more embodiments, when line2 522 is de-energized, power switch 520 may be open thus potentially preventing power from being transferred between utility power source 502 and consumer power load 504 via line2 522.

According to one or more embodiments, utility power source 502 may be the same or similar as utility power source 104. According to one or more embodiments, consumer power load 504 may be the same or similar as consumer power load 106. According to one or more embodiments, backfeed protector 102 may include power switch 506, power switch 520, indicator 516, indicator 518, indicator 526, and indicator 528. According to one or more embodiments, backfeed indicator 310A may include indicator 516, indicator 518, indicator 526, and indicator 528.

Figure 6A:
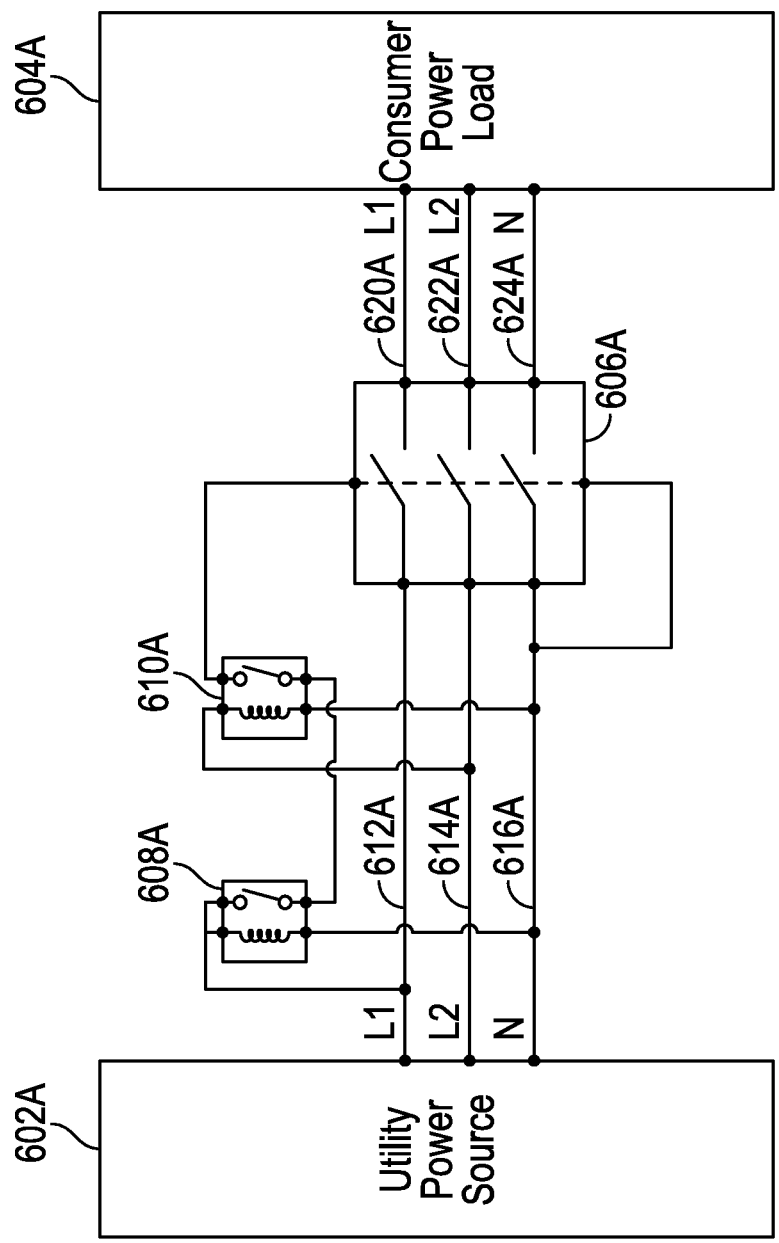
FIG. 6A is a wiring schematic depicting an example backfeed protector schematic designed where both energized conductors are powered by the utility power source in order to resume power.

Referring now to FIG. 6A, an example backfeed protector schematic is shown, according to one or more embodiments. Utility power source 602A may have line1 612A, line2 614A, and neutral 616A, and be electrically connected with power switch 606A via line1 612A, line2 614A, and neutral 616A. For example, line1 612A can be a 120 VAC RMS power source with reference to neutral 616A, and line2 616B can be a 120 VAC RMS power source with reference to neutral 616A where line2 614A is out of phase with line1 612A to create 220 VAC RMS.

Power switch 606A may be normally open, and have a control coil set of contacts, a first set of normally open contacts, a second set of normally open contacts, and a third set of normally open contacts. A first terminal of the first set of normally open contacts of power switch 606A may be electrically connected to line1 612A and a second terminal of the first set of normally open contacts of power switch 606A may be electrically connected to line1 620A. A first terminal of the second set of normally open contacts of power switch 606A may be electrically connected to line2 614A and a second terminal of the second set of normally open contacts of power switch 606A may be electrically connected to line2 622A. A first terminal of the third set of normally open contacts of power switch 606A may be electrically connected to neutral 616A and a second terminal of the second set of normally open contacts of power switch 606A may be electrically connected to neutral 624A. A second terminal of the control coil contacts of power switch 606A may be electrically connected to neutral 616A.

Relay 608A may have a control coil set of contacts and a first set of normally open contacts. Relay 608A may have a first terminal of the control coil electrically connected to line1 612A and a second terminal of the control coil electrically connected to neutral 616A. Relay 610A may have a control coil set of contacts and a first set of normally open contacts. A first terminal of the first normally open contact set of relay 608A may be electrically connected a first terminal of the first normally open contact set of relay 610A. A second terminal of the first normally open contact set of relay 608A may be electrically connected to line1 612A. A first terminal of a control coil of relay 610A may be electrically connected to line2 614A and a second terminal of the control coil of relay 610A may be electrically connected to neutral 616A. A second terminal of the first normally closed set of contacts of the relay 610A may be electrically connected to a first terminal of the control coil of power switch 606A.

Consumer power load 604A may have line1 620A, line2 622A, and neutral 624A, and be electrically connected to power switch 606A via line1 620A, line2 622A, and neutral 624A.

According to one or more embodiments, when utility power source 602A is energized for both line1 612A and line2 614A, line1 612A may energize the control coil of 608A and line2 614A may energize the control coil of relay 610A which may transfer line1 612A power to the control coil for power switch 606A which may in turn energize the control coil of power switch 606A such that power may transfer between the power switch 606A and consumer power load 604A via line1 612A line2 614A, and neutral 616A.

According to one or more embodiments, when utility power source 602A is energized for line1 612A and de-energized for line2 614A, the first normally open contact set of relay 608A may be closed due to line1 612A energizing the control coil of relay 608A and the first normally open contact set of relay 610A may remain in the normally open state due line2 614A being de-energized thus not providing power to the control coil of power switch 606A which may keep power switch 606A in the normally open state and may not allow power to be transferred between the utility power source 602A and consumer power load 604A.

According to one or more embodiments, when utility power source 602A is de-energized for line1 612A and energized for line2 614A, the first normally open contact set of relay 608A may be in the normally open state due to line1 612A being de-energized and the first normally open contact set of relay 610A may be closed due to line2 being energized thus not providing power to the control coil of power switch 606A which may keep power switch 606A in the normally open state and may not allow power to be transferred between the utility power source 602A and consumer power load 604A.

According to one or more embodiments, line1 612A, line2 614A, and neutral 616A may be electrically disconnected by power switch 606A.

According to one or more embodiments, though FIG. 6A shows line1 612A and line2 614A, a person of skill in the art would appreciate that the circuit can be extended to cover additional power lines (e.g., line3, line4, etc.).

According to one or more embodiments, utility power source 602A may be the same or similar as utility power source 104. According to one or more embodiments, consumer power load 604A may be the same or similar as consumer power load 106. According to one or more embodiments, backfeed protector 102 may include power switch 606A, relay 608A, and relay 610A. According to one or more embodiments, power switch 206A may include power switch 606A. According to one or more embodiments, power controller 208A may include relay 608A, and relay 610A.

Figure 6B:
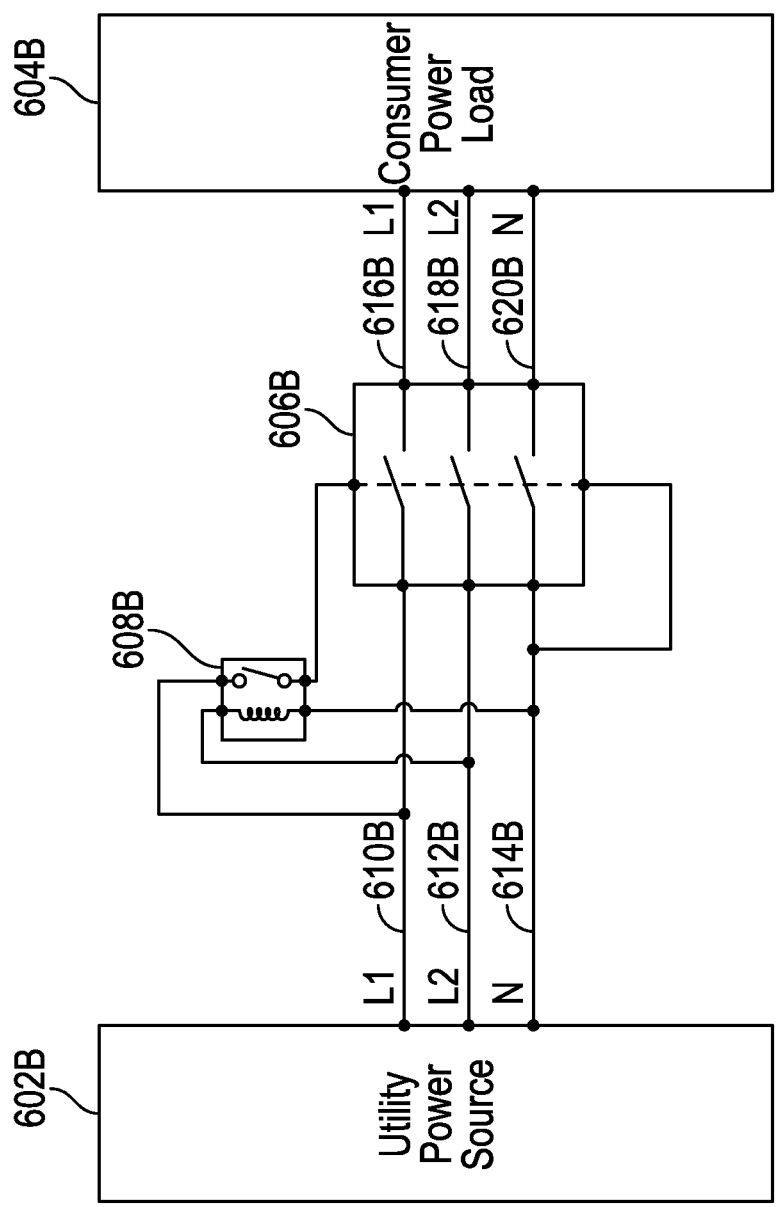
FIG. 6B is a wiring schematic depicting an example backfeed protector schematic designed where both energized conductors are powered by the utility power source in order to resume power without one of the relays of FIG. 6A.

Referring now to FIG. 6B, an example backfeed protector schematic is shown, according to one or more embodiments. Utility power source 602B may have line1 610B, line2 612B, and neutral 614B, and be electrically connected with power switch 606B via line1 610B, line2 612B, and neutral 614B. For example, line1 610B can be a 120 VAC RMS power source with reference to neutral 614B, and line2 612B can be a 120 VAC RMS power source with reference to neutral 614A where line2 612A is out of phase with line1 610B to create 220 VAC RMS.

Power switch 606B may be normally open, and have a control coil set of contacts, a first set of normally open contacts, a second set of normally open contacts, and a third set of normally open contacts. A second terminal of the control coil contacts of power switch 606B may be electrically connected to neutral 614B. A first terminal of the first set of normally open contacts of power switch 606B may be electrically connected to line1 610B and a second terminal of the first set of normally open contacts of power switch 606B may be electrically connected to line1 616B. A first terminal of the second set of normally open contacts of power switch 606B may be electrically connected to line2 612B and a second terminal of the second set of normally open contacts of power switch 606B may be electrically connected to line2 618B. A first terminal of the third set of normally open contacts of power switch 606B may be electrically connected to neutral 614B and a second terminal of the second set of normally open contacts of power switch 606B may be electrically connected to neutral 620B. Relay 608B may have a control coil set of contacts and a first set of normally open contacts. Relay 608B may have a first terminal of the control coil electrically connected to line2 612B and a second terminal of the control coil electrically connected to neutral 614B. A first terminal of the first set of normally open contacts of relay 608B may be electrically connected a first terminal of the control coil of power switch 606B. A second terminal of the first set of normally open contacts of relay 608B may be electrically connected to line1 610B.

Consumer power load 604B may have line1 616B, line2 618B, and neutral 620B, and be electrically connected to power switch 606B via line1 616B, line2 618B, and neutral 620B.

According to one or more embodiments, when utility power source 602B is energized for both line1 610B and line2 612B, line2 612B may energize the control coil to close the first normally closed contacts set of relay 608B thus applying line1 610B power to the control coil of power switch 606B which in turn closes power switch 606B such that power may transfer between utility power source 602B and consumer power load 604B via line1 610B, line2 612B, and neutral 614B.

According to one or more embodiments, when utility power source 602B is energized for line1 610B and de-energized for line2 612B, the first normally open contact set of relay 608B may remain in the normally open state due to line2 612B being de-energized thus not providing power to the control coil of power switch 606B which may keep power switch 606B in the normally open state and not allow power to be transferred between the utility power source 602B and consumer power load 604B.

According to one or more embodiments, line1 610B, line2 612B, and neutral 614B may be electrically disconnected by power switch 406B.

According to one or more embodiments, when utility power source 602B is de-energized for line1 610B and energized for line2 612B, the first normally open contact set of relay 608B may be closed due to line2 612B being energized and due to line1 610B being de-energized there may be no power applied to the control coil of power switch 606B which may keep power switch 606B in the normally open state and not allow power to be transferred between the utility power source 602B and consumer power load 604B.

According to one or more embodiments, when utility power source 602B is de-energized for line1 610B and de-energized for line2 612B, the power switch 606A may be maintained in the normally open state and not allowing power to be transferred between the utility power source 602B and consumer power load 604B.

According to one or more embodiments, though FIG. 6B shows line1 610B and line2 612B, a person of skill in the art would appreciate that the circuit can be extended to cover additional power lines (e.g., line3, line4, etc.).

According to one or more embodiments, utility power source 602B may be the same or similar as utility power source 104. According to one or more embodiments, consumer power load 604B may be the same or similar as consumer power load 106. According to one or more embodiments, backfeed protector 102 may include power switch 606B, and relay 608B. According to one or more embodiments, power switch 206A may include power switch 606B. According to one or more embodiments, power controller 208A may include relay 608B.

Figure 7A:
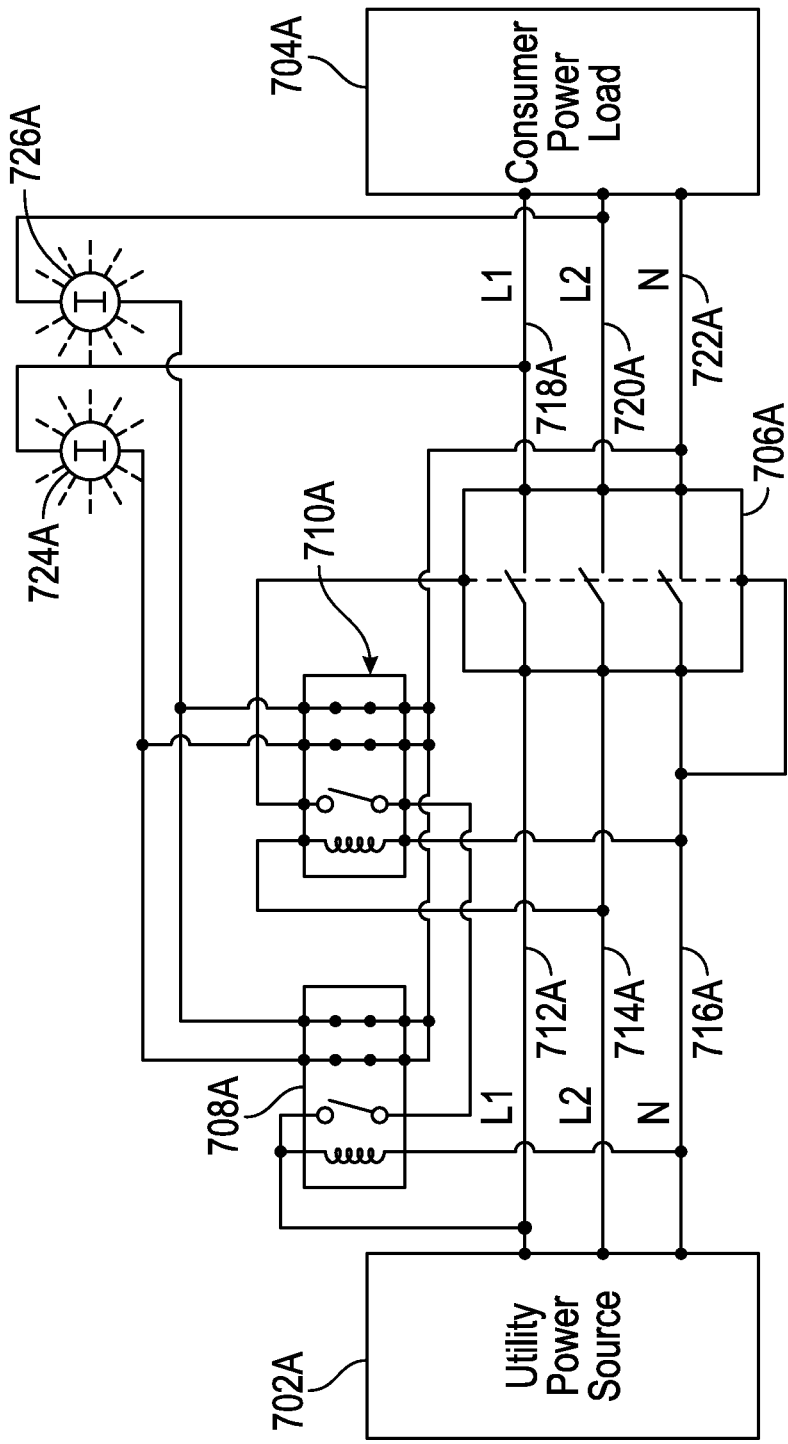
FIG. 7A is a wiring schematic depicting an implementation of the embodiment of FIG. 6A (and FIG. 3A) extended with two backfeed indicators.

Referring now to FIG. 7A, an example backfeed protector schematic is shown, according to one or more embodiments. Utility power source 702A may have line1 712A, line2 714A, and neutral 716A, and be electrically connected with power switch 706A via line1 712A, line2 714A, and neutral 716A. For example, line1 712A can be a 120 VAC RMS power source with reference to neutral 716A, and line2 714B can be a 120 VAC RMS power source with reference to neutral 716A where line2 714A is out of phase with line1 712A to create 220 VAC RMS.

Power switch 706A may be normally open, and have a control coil set of contacts, a first set of normally open contacts, a second set of normally open contacts, and a third set of normally open contacts. A first terminal of the first set of normally open contacts of power switch 706A may be electrically connected to line1 712A and a second terminal of the first set of normally open contacts of power switch 706A may be electrically connected to line1 718A. A first terminal of the second set of normally open contacts of power switch 706A may be electrically connected to line2 714A and a second terminal of the second set of normally open contacts of power switch 706A may be electrically connected to line2 720A. A first terminal of the third set of normally open contacts of power switch 706A may be electrically connected to neutral 716A and a second terminal of the second set of normally open contacts of power switch 706A may be electrically connected to neutral 722A. A second terminal of the control coil contacts of power switch 706A may be electrically connected to neutral 716A.

Relay 708A may have a control coil set of contacts, a first set of normally open contacts, a second set of normally closed contacts, and a third set of normally closed contacts. Relay 710A may have a control coil set of contacts, a first set of normally open contacts, a second set of normally closed contacts, and a third set of normally closed contacts. Relay 708A may have a first terminal of the control coil electrically connected to line1 712A and a second terminal of the control coil electrically connected to neutral 716A. A first terminal of the first set of normally open contacts of relay 708A may be electrically connected to line1 712A. A second terminal of the first set of normally open contacts of relay 708A may be electrically connected a first terminal of the first set of normally open contacts of relay 710A. A second terminal of the first set of normally open contacts of relay 710A may be electrically connected to a first terminal of the control coil of power switch 706A.

Consumer power load 704A may have line1 718A, line2 720A, and neutral 722A, and be electrically connected to power switch 706A via line1 718A, line2 720A, and neutral 722A.

Indicator 724A may have a first and second terminal. Indicator 726A may have a first and second terminal. The first terminal of indicator 724A may be electrically connected to line1 718A. The second terminal of indicator 724A may be electrically connected to a first terminal of the second set of normally closed contacts of relay 708A and a first terminal of the second set of normally closed contacts of relay 710A. The first terminal of indicator 726A may be electrically connected to line2 720A. The second terminal of indicator 726A may be electrically connected to a first terminal of the third set of normally closed contacts of relay 708A and a first terminal of the third set of normally closed contacts of relay 710A. A second terminal of the second set of normally closed contacts of relay 708A, a second terminal of the third set of normally closed contacts of relay 708A, a second terminal of the second set of normally closed contacts of relay 710A, and a third terminal of the second set of normally closed contacts of relay 710A may be electrically connected to neutral 722A.

According to one or more embodiments, when utility power source 702A is energized for both line1 712A and line2 714A, line1 612A may energize the control contacts of relay 708A and line2 714A may energize the contacts of relay 714A thus applying line1 712A voltage to a control coil for power switch 706A which in turn closes power switch 706A such that power can be transferred between the utility power 702A and consumer power load 704A. The second and third set of normally closed contacts in relay 708A and 710A may be opened due to both control coils being energized thus not allowing power to reach indicator 724A and 726A.

According to one or more embodiments, when utility power source 702A is energized for line1 712A and de-energized for line2 714A, the first set of normally open contacts of relay 708A may be closed due to the control coil of relay 608A being energized by line1 712A and the contacts of relay 710A may remain in the normally open state due line2 614A being de-energized thus not providing power to the control coil of power switch 706A which may keep power switch 706A in the normally open state and may not allow power to be transferred between the utility power source 702A and consumer power load 704A.

According to one or more embodiments, line1 712A, line2 714A, and neutral 716A may be electrically disconnected by power switch 706A.

According to one or more embodiments, when utility power source 702A is energized for line1 712A and de-energized for line2 714A, if the consumer power load 704A backfeeds line1 718A, indicator 724A may illuminate due the second set of normally closed contacts of relay 710A being closed thus allowing power to reach indicator 724A. Indicator 726A may not illuminate due to line2 720A being de-energized thus there is no power reaching indicator 726A.

According to one or more embodiments, when utility power source 702A is energized for line1 712A and de-energized for line2 714A, if the consumer power load 704A backfeeds line2 720A, indicator 726A may illuminate due the third set of normally closed contacts of relay 710A being closed thus allowing power to reach indicator 726A. Indicator 724A may not illuminate due to line1 718A being de-energized thus there is no power reaching indicator 724A.

According to one or more embodiments, when utility power source 702A is energized for line1 712A and de-energized for line2 714A, if the consumer power load 704A backfeeds line1 718A and line2 720A, indicator 724A may illuminate due the second set of normally closed contacts of relay 710A being closed thus allowing power to reach indicator 724A, and indicator 726A may illuminate due the third set of normally closed contacts of relay 708A being closed thus allowing power to reach indicator 726A.

According to one or more embodiments, when utility power source 702A is de-energized for line1 712A and energized for line2 714A, the first set of normally open contacts of relay 708A may be in the normally open state due to line1 712A being de-energized and the first set of normally open contacts of relay 710A may be closed due to line2 being energized thus not providing power to the control coil of power switch 706A which may keep power switch 706A in the normally open state and not allowing power to be transferred between the utility power source 702A and consumer power load 704A.

According to one or more embodiments, when utility power source 702A is de-energized for line1 712A and energized for line2 714A, if the consumer power load 704A backfeeds line1 718A, indicator 724A may illuminate due the second set of normally closed contacts of relay 708A being closed thus allowing power to reach indicator 724. Indicator 726A may not illuminate due to line2 720A not being energized thus there is no power reaching indicator 726A.

According to one or more embodiments, when utility power source 702A is de-energized for line1 712A and energized for line2 714A, if the consumer power load 704A backfeeds line2 720A, indicator 726A may illuminate due the third set of normally closed contacts of relay 708A being closed thus allowing power to reach indicator 726A. Indicator 724A may not illuminate due to line1 718A not being energized thus there is no power reaching indicator 726A.

According to one or more embodiments, when utility power source 702A is de-energized for line1 712A and energized for line2 714A, if the consumer power load 704A backfeeds line1 718A and line2 720A, indicator 724A may illuminate due the second set of normally closed contacts of relay 708A being closed thus allowing power to reach indicator 724, and indicator 726A may illuminate due the third set of normally closed contacts of relay 708A being closed thus allowing power to reach indicator 726A.

According to one or more embodiments, when utility power source 702A is de-energized for line1 712A and de-energized for line2 714A, the power switch 706A may be maintained in the normally open state and not allowing power to be transferred between the utility power source 702A and consumer power load 704A. Backfeeding line1 718A and line2 720A may perform similar functions as to when line1 718A and line2 720A are backfeed individually.

According to one or more embodiments, though FIG. 7A shows line1 712A and line2 714A, a person of skill in the art would appreciate that the circuit can be extended to cover additional power lines (e.g., line3, line4, etc.).

According to one or more embodiments, indicator 724A may illuminate when consumer power load 704A is backfeeding and reverses the polarity of line1 718A and neutral 722A. For example, instead of a homeowner connecting consumer line1 to utility line1 and consumer neutral to utility neutral, the consumer connects consumer line1 to utility neutral and consumer neutral to utility line1. According to one or more embodiments, indicator 726A may illuminate when consumer power load 704A is backfeeding and reverses the polarity of line2 720A and neutral 722A. For example, instead of a homeowner connecting consumer line2 to utility line2 and consumer neutral to utility neutral, the consumer connects consumer line2 to utility neutral and consumer neutral to grid line2.

According to one or more embodiments, utility power source 702A may be the same or similar as utility power source 104. According to one or more embodiments, consumer power load 704A may be the same or similar as consumer power load 106. According to one or more embodiments, backfeed protector 102 may include power switch 706A, relay 708A, relay 710A, indicator 724A, and indicator 726A. According to one or more embodiments, power switch 206A may include power switch 706A. According to one or more embodiments, power controller 208A may include relay 708A, and relay 710A. According to one or more embodiments, backfeed indicator 310A may include indicator 724A and indicator 726A.

Figure 7B:
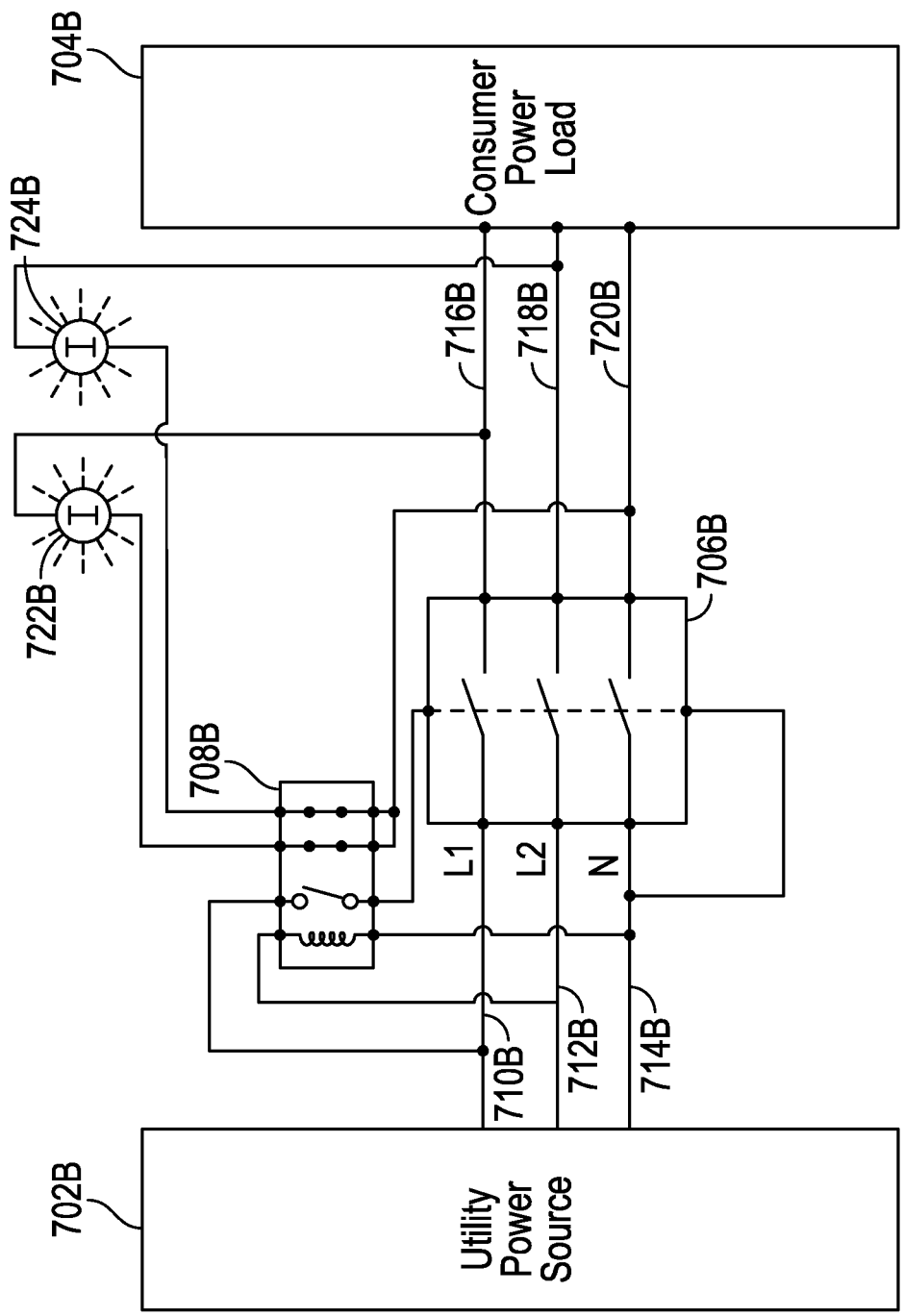
FIG. 7B is a wiring schematic depicting an implementation of the embodiment of FIG. 6B extended with two backfeed indicators.

Referring now to FIG. 7B, an example backfeed protector schematic is shown, according to one or more embodiments. Utility power source 702B may have line1 710B, line2 712B, and neutral 714B, and be electrically connected with power switch 706B via line1 710B, line2 712B, and neutral 714B. For example, line1 710B can be a 120 VAC RMS power source with reference to neutral 714B, and line2 712B can be a 120 VAC RMS power source with reference to neutral 714B where line2 712B is out of phase with line1 710A to create 220 VAC RMS.

Power switch 706B may be normally open, and have a control coil set of contacts, a first set of normally open contacts, a second set of normally open contacts, and a third set of normally open contacts. A second terminal of the control coil contacts of power switch 706B may be electrically connected to neutral 714B. A first terminal of the first set of normally open contacts of power switch 706B may be electrically connected to line1 710B and a second terminal of the first set of normally open contacts of power switch 706B may be electrically connected to line1 716B. A first terminal of the second set of normally open contacts of power switch 706B may be electrically connected to line2 712B and a second terminal of the second set of normally open contacts of power switch 706B may be electrically connected to line2 718B. A first terminal of the third set of normally open contacts of power switch 706B may be electrically connected to neutral 714B and a second terminal of the second set of normally open contacts of power switch 706B may be electrically connected to neutral 720B.

Relay 708B may have a control coil set of contacts, a first set of normally open contacts, a second set of normally closed contacts, and a third set of normally closed contacts. Relay 708B may have a first terminal of the control coil electrically connected to line2 712B and a second terminal of the control coil electrically connected to neutral 714B. A first terminal of the normally open set of contacts of the relay 708B may be electrically connected to line1 710B. A second terminal of the first set of normally open contacts of relay 708B may be electrically connected to a first terminal of the control coil of power switch 706B.

Consumer power load 704B may have line1 716B, line2 718B, and neutral 720B, and be electrically connected to power switch 706B via line1 716B, line2 718B, and neutral 720B.

Indicator 722B may have a first and second terminal. Indicator 724B may have a first and second terminal. The first terminal of indicator 722B may be electrically connected to line1 716B. The second terminal of indicator 722B may be electrically connected to a first terminal of the second set of normally closed contacts of relay 708B. The first terminal of indicator 724B may be electrically connected to line2 718B. The second terminal of indicator 724B may be electrically connected to a first terminal of the third set of normally closed contacts of relay 708B. A second terminal of the second set of normally closed contacts of relay 708B, and a second terminal of the third set of normally closed contacts of relay 708B may be electrically connected to neutral 720A.

According to one or more embodiments, when utility power source 702B is energized for both line1 710B and line2 712B, line2 712B may energize the control coil of relay 708B thus applying line1 710B power to the control coil for power switch 706B which in turn may close power switch 706B such that power can transfer between utility power source 702B and consumer power load 704B. The second and third set of normally closed contacts in relay 708B are opened thus there is no power reaching indicator 722B and indicator 724B.

According to one or more embodiments, line1 710B, line2 712B, and neutral 614B may be electrically disconnected by power switch 706A.

According to one or more embodiments, when utility power source 702B has line1 710B de-energized or line2 712B de-energized, or both line1 710B and line2 712B de-energized, power switch 706B may remain in the normally open state due to no power reaching the control coil of power switch 706B and may not allow power to be transferred between the utility power source 702B and consumer power load 704B.

According to one or more embodiments, when utility power source 702B has line1 710B de-energized or line2 712B de-energized, or both line1 710B and line2 712B de-energized, if the consumer power load 704B backfeeds line1 716B, indicator 722B may illuminate due the third set of normally closed contacts of relay 708B being closed thus allowing power to reach indicator 722B. Indicator 724B may not illuminate due to line2 718B being de-energized thus there is no power to reach indicator 724B.

According to one or more embodiments, when utility power source 702B has line1 710B de-energized or line2 712B de-energized, or both line1 710B and line2 712B de-energized, if the consumer power load 704B backfeeds line2 718B, indicator 724B may illuminate due the second set of normally closed contacts of relay 708A being closed thus allowing power to reach indicator 724B. Indicator 722B may not illuminate due to line1 716B being de-energized thus there is no power to reach indicator 722B.

According to one or more embodiments, when utility power source 702B has line1 710B de-energized or line2 712B de-energized, or both line1 710B and line2 712B de-energized, if the consumer power load 704B backfeeds line1 716B and line2 718B, indicator 722B may illuminate due the third set of normally closed contacts of relay 708B being closed thus allowing power to reach indicator 722B, and indicator 724B may illuminate due the second set of normally closed contacts of relay 708A being closed thus allowing power to reach indicator 724B.

According to one or more embodiments, though FIG. 7B shows line1 710B and line2 712B, a person of skill in the art would appreciate that the circuit can be extended to cover additional power lines (e.g., line3, line4, etc.).

According to one or more embodiments, indicator 722B may illuminate when consumer power load 704B is backfeeding and reverses the of polarity line1 716B and neutral 720B. For example, instead of a homeowner connecting consumer line1 to utility line1 and consumer neutral to utility neutral, the consumer connects consumer line1 to utility neutral and consumer neutral to utility line1. According to one or more embodiments, indicator 724B may illuminate when consumer power load 704B is backfeeding and reverses the polarity of line2 718B and neutral 720B. For example, instead of a homeowner connecting consumer line2 to utility line2 and consumer neutral to utility neutral, the consumer connects consumer line2 to utility neutral and consumer neutral to grid line2.

According to one or more embodiments, utility power source 702B may be the same or similar as utility power source 104. According to one or more embodiments, consumer power load 704B may be the same or similar as consumer power load 106. According to one or more embodiments, backfeed protector 102 may include power switch 706B, relay 708B, indicator 722B, and indicator 724B. According to one or more embodiments, power switch 206A may include power switch 706B. According to one or more embodiments, power controller 208A may include relay 708B. According to one or more embodiments, backfeed indicator 310A may include indicator 722B, and indicator 724B.

Figure 8:
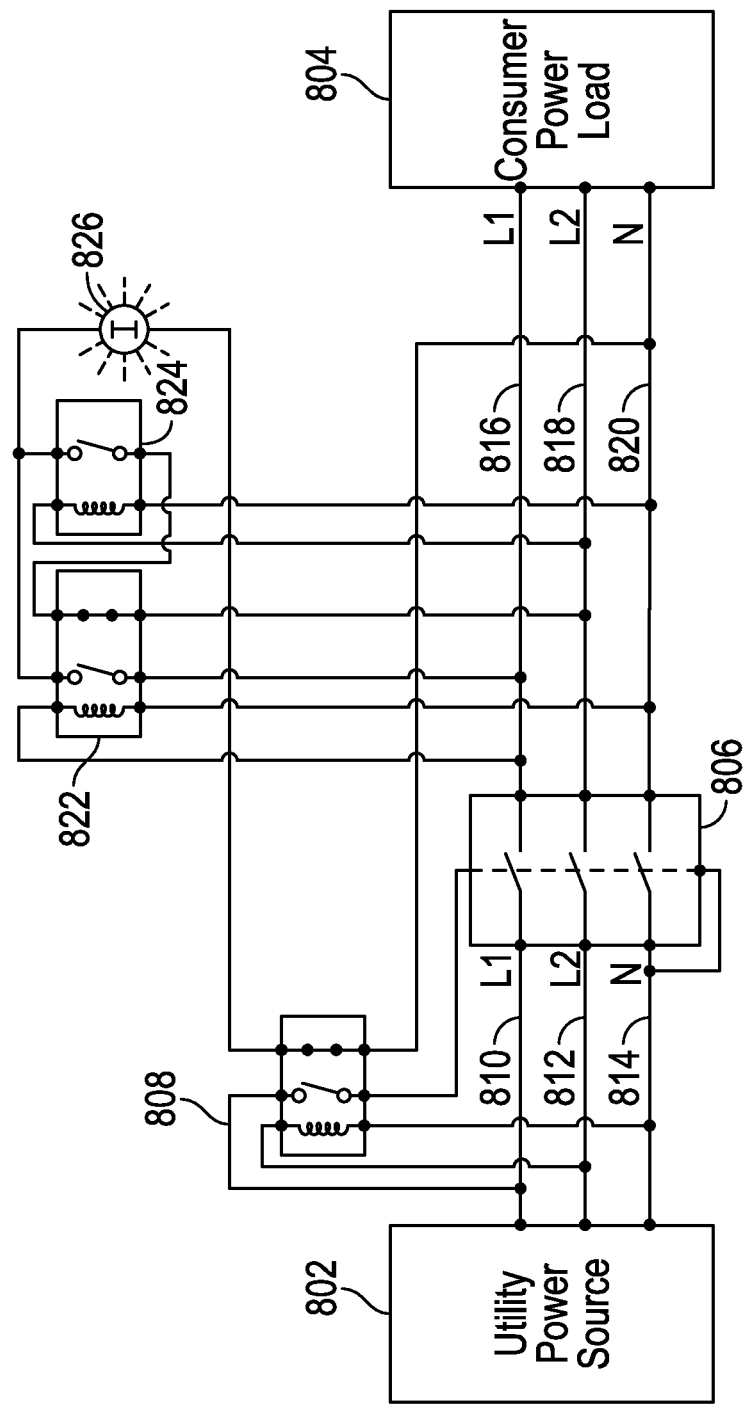
FIG. 8 is a wiring schematic depicting another example embodiment of a backfeed protector designed for two energized conductors and a single backfeed indicator.

Referring now to FIG. 8, an example backfeed protector schematic is shown, according to one or more embodiments. Utility power source 802 may have line1 810, line2 812, and neutral 814, and be electrically connected with power switch 806 via line1 810, line2 812, and neutral 814. For example, line1 810 can be a 120 VAC RMS power source with reference to neutral 814, and line2 812 can be a 120 VAC RMS power source with reference to neutral 814 where line2 812 is out of phase with line1 810 to create 220 VAC RMS.

Power switch 806 may be normally open, and have a control coil set of contacts, a first set of normally open contacts, a second set of normally open contacts, and a third set of normally open contacts. A second terminal of the control coil contacts of power switch 806 may be electrically connected to neutral 814. A first terminal of the first set of normally open contacts of power switch 806 may be electrically connected to line1 810 and a second terminal of the first set of normally open contacts of power switch 806 may be electrically connected to line1 816. A first terminal of the second set of normally open contacts of power switch 806 may be electrically connected to line2 812 and a second terminal of the second set of normally open contacts of power switch 806 may be electrically connected to line2 818. A first terminal of the third set of normally open contacts of power switch 806 may be electrically connected to neutral 814 and a second terminal of the second set of normally open contacts of power switch 806 may be electrically connected to neutral 820. A second terminal of the control coil contacts of power switch 806 may be electrically connected to neutral 814.

Relay 808 may have a control coil set of contacts, a first set of normally open contacts, and a second set of normally closed contacts. A first terminal of a control coil of relay 808 may be electrically connected to line2 812 and a second terminal of the control coil may be electrically connected to neutral 814. A first terminal of the first set of normally open contacts of relay 808B may be electrically connected a first terminal of the control coil of power switch 806B, and a second terminal of the first set of normally open contacts of relay 808B may be electrically connected to line1 810.

Consumer power load 804 may have line1 816, line2 818, and neutral 820, and be electrically connected to power switch 806 via line1 816, line2 818, and neutral 820.

Relay 822 may have a control coil set of contacts, a first set of normally open contacts, and a second set of normally closed contacts. Relay 824 may have a control coil set of contacts and a set of normally open contacts. Indicator 826 may have a first and second terminal. A first terminal of the control coil of relay 822 may be electrically connected to line1 816 and a second terminal of the control coil of relay 822 may be electrically connected to neutral 820. A first terminal of the first set of normally open contacts of relay 822 may be electrically connected a first terminal of the first set of normally open contacts of relay 824 and the first terminal of indicator 826. A second terminal of the first set of normally open contacts of relay 822 may be electrically connected to line1 816. A first terminal of the second set of normally closed contacts of relay 822 may be electrically connected to a second terminal of the first set of normally open contact set of relay 824. A second terminal of the second normally closed contact set of relay 822 may be electrically connected to line2 818. The second terminal of indicator 826 may be electrically connected to a first terminal of the second set of normally closed contacts of relay 808. A second terminal of the second set of normally closed contacts of relay 808 may be electrically connected to neutral 820.

According to one or more embodiments, when utility power source 802 is energized for both line1 810 and line2 812, line2 812 may close the first set of normally open contacts of relay 808 thus applying line1 810 power to the control coil for power switch 806 which in turn closes power switch 806 such that power can transfer through the power switch 808 via line1 810, line2 812, and neutral 814. The second set of normally closed contacts in relay 808 may be open thus there is no power reaching indicator 826.

According to one or more embodiments, when utility power source 802 has line1 810 de-energized or line2 812 de-energized, or both line1 810 and line2 812 de-energized, power switch 806 may remain in the normally open state due to no power reaching the control coil of power switch 806 and may not allow power to be transferred between the utility power source 802 and consumer power load 804.

According to one or more embodiments, line1 810, line2 812, and neutral 814 may be electrically disconnected by power switch 806.

According to one or more embodiments, when utility power source 802 has either line1 810 or line2 812 de-energized, or both line1 810 and line2 812 de-energized, if the consumer power load 804 backfeeds line1 816, indicator 826 may illuminate due the first set of normally open contacts of relay 822 being closed and line1 816 energized thus allowing power to reach indicator 826.

According to one or more embodiments, if utility power source 802 has either line1 810 or line2 812 de-energized or both line1 810 and line2 812 de-energized, when the consumer power load 804 backfeeds line2 818, indicator 826 indicates (e.g., illuminates) due to the second set of normally closed contacts of relay 822 being closed due to line1 816 being de-energized which transfers line2 818 to the first set of normally open contacts of relay 824 and the normally open contacts of relay 824 closes due to line2 818 energizing the control coil of relay 824 allowing power to reach indicator 826.

According to one or more embodiments, when utility power source 802 has either line1 810 or line2 812 de-energized, or both line1 810 and line2 812 de-energized, if the consumer power load 804 backfeeds line1 816 and line2 818, indicator 826 may illuminate due the first normally open contact of relay 822 being closed due to line1 816 energizing the control coil of relay 822 which allows power to reach indicator 826. When relay 822 is energized, the second set of normally closed contacts is open which stops power from passing through the normally open contacts of relay 824. This configuration of relay 822 and relay 826 may allow line1 816 to be the power for indicator 826 when both line1 816 and line2 818 are being backfeed. According to one or more embodiments, relay 822 and relay 824 may contain delay circuits for latching and/or unlatching. For example, a delay in relay 822 and/or relay 824 may stop short circuits between line1 816 and line2 818.

According to one or more embodiments, though FIG. 8 shows line1 810 and line2 812, a person of skill in the art would appreciate that the circuit can be extended to cover additional power lines (e.g., line3, line4, etc.).

According to one or more embodiments, indicator 826 may illuminate when consumer power load 804 is backfeeding and reverses the polarity of line1 816 and neutral 820. For example, instead of a homeowner connecting consumer line1 to utility line1 and consumer neutral to utility neutral, the consumer connects consumer line1 to utility neutral and consumer neutral to utility line1. According to one or more embodiments, indicator 826 may illuminate when consumer power load 804 is backfeeding and reverses the polarity of line2 818 and neutral 820. For example, instead of a homeowner connecting consumer line2 to utility line2 and consumer neutral to utility neutral, the consumer connects consumer line2 to utility neutral and consumer neutral to utility line2.

According to one or more embodiments, utility power source 802 may be the same or similar as utility power source 104. According to one or more embodiments, consumer power load 804 may be the same or similar as consumer power load 106. According to one or more embodiments, backfeed protector 102 may include power switch 806, relay 808, relay 822, relay 824, and indicator 826. According to one or more embodiments, power switch 206A may include power switch 806. According to one or more embodiments, power controller 208A may include relay 808, relay 822, and relay 824. According to one or more embodiments, backfeed indicator 310A may include indicator 826.

Several other variations of the above embodiments are possible, and some are discussed below.

According to one or more embodiments, protection elements may be added to FIGS. 1-8. For example, backfeed protector 102 may have fuses to protect against excessive current. For another example, feedback protector 102 may have thermal protection by including a thermal shut down circuit for when backfeed protector 102 overheats.

A person of skill in the art would appreciate functional equivalent circuits may be derived from this disclosure. For example, in FIG. 6B where the control coil of relay 608B is electrically connected to line2 612B and line1 610B is connected to the first terminal of the normally open contact, an equivalent circuit could be the control coil of relay 608B electrically connected to line1 610B and line2 612B may be electrically connected to the first terminal of the normally open contact.

According to one or more embodiments, the backfeed protector is configured to operate in high voltage environments. For example, the various embodiments shown in FIGS. 1-8 may operate on voltages greater than or equal to 50 VAC RMS. In another example, the various embodiments shown in FIGS. 1-8 may operate on voltages greater than or equal to 30 VAC RMS. A person of skill in the art would select properly rated components for different types of applications.

According to one or more embodiments, the various implementations of power switch may be substituted in different embodiments so long as the embodiment creates an operable circuit. For example, power switch 406B may be substituted for power switch 506. According to one or more embodiments, the various implementations of power controller may be substituted in different embodiments so long as the embodiment creates an operable circuit. For example, relay 408A may be substituted with relay 408B.

According to one or more embodiments, a power switch may be a normally closed ("NC") switch that is opened when the consumer power load is attempting to backfeed power into a de-energized utility power source. For example, the power generated by a consumer power load may be used to open the power switch in order to stop backfeeding.

According to one or more embodiments, a terminal of a coil of the power switch may be connected to neutral. For example, when the utility power has lines line1, line2, and neutral, by referencing the coil to neutral, a lower voltage may be present on the coil compared to using line1 and line2 energize the coil. This lower voltage may have various benefits such the potential ability to use lower voltage components which are expected to have lower costs, possible lower heat generated due to the lower voltages, and possible less power used due to lower voltage.

While the example backfeed protectors are shown as a single device, one of skill in the art would appreciate that other configurations are possible to achieve the same or similar functional result.

In some embodiments, the backfeed protector could be connected with a communication bus or system and the indicator can be remote, such as at the utility company. A person of skill in the art would appreciate how to modify the backfeed protection system including with optional outside power supply (e.g., a battery) to achieve a remote indication and communications (e.g., cellular, Wi-Fi) in different settings.

Certain examples have been described herein and it will be noted that different combinations of different components from different examples may be possible. Salient features are presented to better explain examples; however, it is clear that certain features may be added, modified, and/or omitted without modifying the functional aspects of these examples as described.

Practitioners skilled in the art will recognize many modifications and variations. The modifications and variations include any relevant combination of the disclosed features. Descriptions herein reciting principles, aspects, and embodiments encompass both structural and functional equivalents thereof. Elements described herein as "coupled" or "communicatively coupled" have an effectual relationship realizable by a direct connection without intervening elements or indirect connection using one or more other intervening elements. Embodiments described herein as "communicating" or "in communication with" another device, module, or elements include any form of communication or link and include an effectual relationship. For example, a communication link may be established using a wired connection, wireless protocols, near-filed protocols, or RFID.

To the extent that the terms "including", "includes", "having", "has", "with", or variants thereof are used in either the detailed description and the claims, such terms are intended to be inclusive in a similar manner to the term "comprising."

The scope of the invention, therefore, is not intended to be limited to the exemplary embodiments and aspects that are shown and described herein. Rather, the scope and spirit of the invention is embodied by the appended claims.

The following describes various examples of the present technology that illustrate various aspects and embodiments of the invention. Generally, examples can use the described aspects in any combination. All statements herein reciting principles, aspects, and embodiments as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

It is noted that, as used herein, the singular forms "a," "an" and "the" include plural referents unless the context clearly dictates otherwise. The use of the word "a" or "an" when used in conjunction with the term "comprising" in the claims and/or the specification may mean "one," but it is also consistent with the meaning of "one or more," "at least one," and "one or more than one." Reference throughout this specification to "one aspect," "an aspect," "certain aspects," "various aspects," or similar language means that a particular aspect, feature, structure, or characteristic described in connection with any embodiment is included in at least one embodiment of the invention. Wherever any of the phrases "for example," "such as," "including" and the like are used herein, the phrase "and without limitation" is understood to follow unless explicitly stated otherwise. Similarly "an example," "exemplary" and the like are understood to be non-limiting. The use of "(s)" on a singular word indicates that the word could be single or plural depending on the design choices of a particular embodiment or solution.

The terms "comprising" and "including" and "having" and "involving" (and similarly "comprises," "includes," "has," and "involves") and the like are used interchangeably and have the same meaning. Specifically, each of the terms is defined consistent with the common United States patent law definition of "comprising" and is therefore interpreted to be an open term meaning "at least the following," and is also interpreted not to exclude additional features, limitations, aspects, etc. Thus, for example, "a process involving steps a, b, and c" means that the process includes at least steps a, b and c. Wherever the terms "a" or "an" are used, "one or more" is understood, unless such interpretation is nonsensical in context.

Appearances of the phrases "in one embodiment," "in at least one embodiment," "in an embodiment," "in certain embodiments," "in some embodiments," and similar language throughout this specification may, but do not necessarily, all refer to the same embodiment or similar embodiments. Furthermore, aspects and embodiments of the invention described herein are merely exemplary, and should not be construed as limiting of the scope or spirit of the invention as appreciated by those of ordinary skill in the art. The disclosed invention is effectively made or used in any embodiment that includes any novel aspect described herein. All statements herein reciting aspects and embodiments of the invention are intended to encompass both structural and functional equivalents thereof. It is intended that such equivalents include both currently known equivalents and equivalents developed in the future.

INDUSTRIAL APPLICABILITY

In addition to the goals stated above, the system, devices and methods herein can be used to save the lives of utility workers, better control the power grid, and prevent improper device installations from having downstream effects.

What is claimed is:

1. A device for backfeed protection, the device comprising:
    a terminal for utility power that includes one or more power connections, and one or more neutral connections;
    a terminal for consumer power that includes one or more power connections, and one or more neutral connections;
    a power switch including one or more conductor switches, and configured to receive one or more control signals for controlling a state of the power switch,
    wherein the one or more conductor switches are electrically connected between the one or more power connections of the terminal for utility power and the one or more power connections of the terminal for consumer power, respectively, and the one or more neutral connections of the terminal for utility power and the one or more neutral connections of the terminal for consumer power, respectively,
    wherein the one or more control signals are configured to maintain each of the one or more conductor switches in an open or a closed state,
    wherein when a conductor switch is in the closed state, electrical power can be transferred between the one or more power connections of the terminal for utility power and the one or more power connections of the terminal for consumer power, respectively, and the one or more neutral connections of the terminal for utility power and the one or more neutral connections of the terminal for consumer power, respectively, and
    wherein when the conductor switch is in the open state, electrical power cannot be transferred between the one or more power connections of the terminal for utility power and the one or more power connections of the terminal for consumer power, respectively, and the one or more neutral connections of the terminal for utility power and the one or more neutral connections of the terminal for consumer power, respectively;
    a power controller electrically connected to the power switch and electrically connected to the terminal for utility power,
    wherein the power controller generates the one or more control signals for controlling the state of the power switch,
    wherein the power controller generates the one or more control signals to close one or more conductor switches when one or more power connections of the terminal for utility power in reference to the one or more neutral connections of the terminal for utility power are energized, and
    wherein the power controller generates the one or more control signals to open one or more conductor switches when one or more power connections of the terminal for utility power in reference to the one or more neutral connections of the terminal for utility power are de-energized.

2. The device of claim 1, wherein the power controller generates one or more control signals to stop transferring all electrical power when at least one of the power connections of the terminal for utility power with reference to the neutral connections of the terminal for utility power is de-energized.

3. The device of claim 1, further comprising a backfeed indicator electrically connected the power controller,
    wherein the power controller is further configured to monitor power connections of the terminal for consumer power and neutral connections of the terminal for consumer power, and signal the backfeed indicator when one of the power connections of the terminal for utility power is de-energized and when one or more power connections of the terminal for consumer power is attempting to backfeed.

4. The device of claim 3, wherein the power controller generates the one or more control signals to stop transferring all electrical power when at least one of the power connections of the terminal for utility power with reference to the neutral connections of the terminal for utility power is de-energized.

5. The device of claim 3, the backfeed indicator includes at least one of an illumination device, an audible device, and a signal to another device.

6. The device of claim 3, wherein the power connections of terminal for utility power include utility line1 and utility line2, the neutral connections of the terminal for utility power include utility neutral, the power connections of terminal for consumer power include consumer line1 and consumer line2, the neutral connections of the terminal for consumer power include consumer neutral, and the backfeed indicator provides a signal indication.

7. The device of claim 3, wherein the backfeed indicator provides a valid indication when a consumer has reversed the polarity of the power connections of terminal for consumer power include consumer line1 and consumer line2; and the neutral connections of the terminal for consumer power include consumer neutral.

8. The device of claim 1, wherein the one or more power connections of terminal for utility power include utility line1 and utility line2; the one or more neutral connections of the terminal for utility power include utility neutral; the one or more power connections of terminal for consumer power include consumer line1 and consumer line2; the one or more neutral connections of the terminal for consumer power include consumer neutral; wherein the power controller includes a relay with a set of normally open contacts where a coil of the relay is connected between utility line1 and utility neutral, one terminal of the set of normally open contacts of the relay is connected to utility line2, and another terminal of the set of normally open contacts of the relay generates the one or more control signals.

9. The device of claim 1, wherein power controller includes a control coil, and the control coil is attached to at least one of the one or more neutral connections of the terminal for utility power include utility neutral.

10. The device of claim 1, wherein the power switch can individually control the transfer of electrical power between each of the one or more power connections of the terminal for utility power, the one or more power connections of the terminal for consumer power, the one or more neutral connections of the terminal for utility power, and the one or more neutral connections of the terminal for consumer power.

11. A device for backfeed protection, the device comprising:
a power controller;
a device power line connecting a utility power conductor to a consumer power conductor with a device power line switch disposed along the device power line between the utility power conductor and the consumer power conductor; and
a device neutral line connecting a utility neutral conductor to a consumer neutral conductor with a device neutral line switch disposed along the device neutral line between the utility neutral conductor and the consumer neutral conductor,
wherein the power controller is connected to the device power line and the device neutral line and senses when the utility power conductor relative to a voltage of the utility neutral conductor is de-energized,
wherein the power controller controls the device power line switch to allow current to flow across the device power line when the utility power conductor is energized, and
wherein the power controller controls the device power line switch to prevent current from flowing across the device power line when the utility power conductor is de-energized.

12. The device of claim 11, wherein the device power line includes a first device power line with a first device power line switch and a first utility power conductor and a second device power line with a second device power line switch and a second utility power conductor, and
the power controller controls the first device power line switch and the second device power line switch to allow current to flow only on the first device power line when the first utility power conductor relative to the voltage of utility neutral conductor is energized.

13. The device of claim 12, wherein the power controller includes a relay with a set of normally open contacts where a coil of the relay is connected between the first device power line and device utility neutral line, one terminal of the normally open contacts of the relay is connected to second device power line, and another terminal of the normally open contacts of the relay generates a control signal for controlling the first device power line switch and the second device power line switch.

14. The device of claim 11, wherein the device power line includes a first device power line with a first device power line switch and a first utility power conductor and a second device power line with a second device power line switch and a second utility power conductor, and
the power controller controls the first device power line switch and the second device power line switch to prevent current from flowing on the first device power line and the second device power line when either of the first utility power conductor the second utility power conductor relative to the voltage of utility neutral conductor is de-energized.

15. The device of claim 11, wherein the power controller controls the device neutral line switch to prevent current from flowing across the utility neutral conductor when the utility power conductor is de-energized.

16. The device of claim 11, further including a backfeed indicator that indicates backfeed when the utility power conductor is de-energized and the consumer power conductor is energized.

17. The device of claim 16, wherein the backfeed indicator includes at least one of an illumination device, an audible device, and a signal to another device.

18. The device of claim 16, wherein the backfeed indicator indicates when the consumer neutral conductor relative to the consumer power conductor is energized.

19. The device of claim 11, wherein the power controller includes a control coil, and the control coil is connected to the utility neutral conductor.

20. The device of claim 11, wherein the device power line includes a first device power line with a first device power line switch, a first utility power conductor, and a first consumer power conductor, and a second device power line with a second device power line switch, a second utility power conductor, and a second consumer power conductor, and
the power controller can individually control a transfer of electrical power between the first utility power conductor and the first consumer power conductor through the first device power line switch, a transfer of electrical power between the second utility power conductor and the second consumer power conductor through the second device power line switch, and a transfer of electrical power between the utility neutral conductor and the consumer neutral conductor through the device neutral line switch.

21. The device of claim 11, wherein the power controller draws power for the operations of the power controller solely from being connected with a utility power source and a consumer power source and without a battery.

22. A method of protecting a utility power source from backfeed from a consumer power source, the method comprising the steps of:
providing a device for backfeed protection containing a circuit that, without consumer interaction, prevents current from flowing from the consumer power source to the utility power source when a power line from the utility power source relative to a neutral line from the utility power source is de-energized;
separating a service line at or near a point of delivery from the utility power source to the consumer power source creating an upstream power line and an upstream neutral line on a side of the utility power source and a downstream power line and a downstream neutral line on a side of the consumer power source;
connecting upstream terminals of the device to the upstream power line and the upstream neutral line and connecting downstream terminals of the device to the downstream power line and the downstream neutral line.

23. A device for backfeed protection, the device comprising:
- a terminal for utility power that includes one or more power connections and one or more neutral connections;
- a terminal for consumer power that includes one or more power connections, and one or more neutral connections;
- a power switch including one or more control signal conductors for controlling a state of the power switch and the power switch being capable of transferring electrical power between the one or more power connections of the terminal for utility power and the one or more power connections of the terminal for consumer power, respectively, and the one or more neutral connections of the terminal for utility power and the one or more neutral connections of the terminal for consumer power, respectively;
- wherein the respective power switch is open in the absence of a control signal over the one or more control signal conductors; and
- a power controller configured to monitor the one or more power connections of the terminal for utility power and configured to generate one or more control signals on the one or more control signal conductors,
- wherein the power controller generates the control signal over the one or more control signal conductors to close the respective power switch when one or more power connections of the terminal for utility power in reference to the one or more neutral connections of the terminal for utility power are energized.

* * * * *